(12) United States Patent
Daha et al.

(10) Patent No.: US 12,047,704 B2
(45) Date of Patent: Jul. 23, 2024

(54) AUTOMATED ADAPTATION OF VIDEO FEED RELATIVE TO PRESENTATION CONTENT

(71) Applicant: Microsoft Technology Licensing, LLC, Redmond, WA (US)

(72) Inventors: Fatima Zohra Daha, Santa Clara, CA (US); Robert Fernand Gordan, Menlo Park, CA (US); Amit Srivastava, San Jose, CA (US); Joshua Alexander Doctors, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 98 days.

(21) Appl. No.: 17/458,003

(22) Filed: Aug. 26, 2021

(65) Prior Publication Data
US 2023/0066504 A1 Mar. 2, 2023

(51) Int. Cl.
*H04N 5/272* (2006.01)
*G06F 16/438* (2019.01)
(Continued)

(52) U.S. Cl.
CPC ......... *H04N 5/272* (2013.01); *G06F 16/4393* (2019.01); *G06N 20/00* (2019.01);
(Continued)

(58) Field of Classification Search
CPC ..... G06F 16/4393; G06F 18/22; G06N 20/00; G06V 10/25; G06V 20/46; H04L 65/4015;
(Continued)

(56) References Cited

U.S. PATENT DOCUMENTS 4,847,678 A 7/1989 Mccauley
8,831,505 B1 9/2014 Seshadri
(Continued)

OTHER PUBLICATIONS

"International Search Report and Written Opinion Issued in PCT Application No. PCT/US21/058870", dated Feb. 23, 2022, 13 Pages.
(Continued)

*Primary Examiner* — Antoinette T Spinks

(57) ABSTRACT

The present disclosure relates to application of artificial intelligence (AI) processing that adapts one or more video feeds relative to presentation content. Trained AI processing automatically generates a combined representation comprising one or more video feeds and presentation content. An exemplary combined representation is the result of contextual analysis by one or more trained AI models that are adapted to consider how to adapt presentation of a video feed relative to displayable presentation content (or visa-versa). A combined representation of one or more video feeds and presentation content is automatically generated (and subsequently rendered) based on a result of contextual evaluation of data associated with a video feed and data attributes of presentation content. A combined representation may comprise a modification of the one or more video feeds, objects of presentation content or a combination thereof. Further examples extend to management of combined representations through an adapted graphical user interface.

20 Claims, 9 Drawing Sheets

(51) Int. Cl.
    *G06N 20/00*     (2019.01)
    *G06V 10/25*     (2022.01)
    *G06V 20/40*     (2022.01)
    *H04L 65/401*     (2022.01)
    *H04N 5/265*     (2006.01)

(52) U.S. Cl.
CPC .............. *G06V 10/25* (2022.01); *G06V 20/46* (2022.01); *H04L 65/4015* (2013.01); *H04N 5/265* (2013.01)

(58) Field of Classification Search
CPC ........ H04N 5/265; H04N 5/272; H04N 7/147; H04N 7/15; H04N 21/2187; H04N 21/47205; H04N 21/816; H04N 21/854; G06T 11/00; G06T 11/60; G06T 2207/10004; G06T 2207/20081; G06T 3/20; G06T 3/40; G06T 7/70; G09B 5/065; G09B 5/10; G09B 7/00; G11B 27/031
See application file for complete search history.

(56) References Cited

U.S. PATENT DOCUMENTS

| | | | |
|---|---|---|---|
| 9,674,243 B2 | 6/2017 | Bader-natal et al. | |
| 10,986,301 B1 | 4/2021 | Schanz | |
| 11,263,397 B1 | 3/2022 | Yu et al. | |
| 11,265,181 B1 | 3/2022 | Springer | |
| 11,875,161 B2* | 1/2024 | Thampy | G06F 9/451 |
| 2005/0160368 A1 | 7/2005 | Liu et al. | |
| 2007/0081075 A1 | 4/2007 | Canova et al. | |
| 2010/0031152 A1 | 2/2010 | Villaron et al. | |
| 2010/0037151 A1 | 2/2010 | Ackerman et al. | |
| 2011/0109751 A1 | 5/2011 | Chang et al. | |
| 2012/0023407 A1 | 1/2012 | Taylor | |
| 2012/0113095 A1 | 5/2012 | Hwang et al. | |
| 2012/0206577 A1 | 8/2012 | Guckenberger et al. | |
| 2012/0310750 A1 | 12/2012 | Schutzbank et al. | |
| 2013/0215292 A1 | 8/2013 | Reichelt | |
| 2014/0072945 A1 | 3/2014 | Gu et al. | |
| 2014/0184721 A1 | 7/2014 | Zhang et al. | |
| 2014/0232814 A1 | 8/2014 | Malhotra et al. | |
| 2014/0362165 A1 | 12/2014 | Ackerman et al. | |
| 2015/0058754 A1 | 2/2015 | Rauh | |
| 2015/0121189 A1 | 4/2015 | Titterington | |
| 2015/0350269 A1 | 12/2015 | Shibata | |
| 2016/0343351 A1* | 11/2016 | Chen | G09G 5/005 |
| 2017/0039867 A1 | 2/2017 | Fieldman | |
| 2017/0237986 A1* | 8/2017 | Choi | H04W 4/80 348/14.02 |
| 2018/0160076 A1 | 6/2018 | Ozaki | |
| 2018/0239504 A1 | 8/2018 | Huang et al. | |
| 2019/0088153 A1 | 3/2019 | Bader-natal et al. | |
| 2019/0205962 A1 | 7/2019 | Piramuthu et al. | |
| 2020/0081606 A1 | 3/2020 | Mo et al. | |
| 2020/0126437 A1 | 4/2020 | Fieldman | |
| 2020/0137316 A1 | 4/2020 | Zavesky et al. | |
| 2020/0371647 A1 | 11/2020 | Gerges et al. | |
| 2020/0388060 A1 | 12/2020 | Rimon | |
| 2020/0412780 A1* | 12/2020 | Devendran | G06N 20/00 |
| 2021/0273892 A1 | 9/2021 | Rakshit | |
| 2022/0086200 A1 | 3/2022 | Lansing et al. | |
| 2022/0121354 A1 | 4/2022 | Xia | |
| 2022/0180052 A1 | 6/2022 | Yu et al. | |
| 2022/0374590 A1 | 11/2022 | Seth et al. | |

OTHER PUBLICATIONS

"Notice of Allowance Issued in U.S. Appl. No. 17/579,846", dated Oct. 5, 2022, 12 Pages.
"International Search Report and Written Opinion Issued in PCT Application No. PCT/US22/036066", dated Oct. 5, 2022, 14 Pages.
"Notice of Allowance Issued in U.S. Appl. No. 17/579,846", dated Feb. 15, 2023, 10 Pages.
"Non Final Office Action Issued in U.S. Appl. No. 17/115,433", dated May 26, 2021, 16 Pages.
"Live Cameras in PowerPoint (Webcams, IP Cameras and Streaming Videos", Retrieved From: https://www.presentationpoint.com/blog/live-cameras-in-powerpoint/, Apr. 17, 2020, 11 Pages.
Aries, Benjamin, "Adding Live Streaming in PowerPoint", Retrieved From: https://web.archive.org/web/20170617163731/https://itstillworks.com/adding-live-streaming-powerpoint-37326.html, Jun. 17, 2017, 3 Pages.
"Notice of Allowance Issued in U.S. Appl. No. 17/579,846", dated Aug. 11, 2023, 8 Pages.
"Notice of Allowance Issued in U.S. Appl. No. 17/579,846", dated May 22, 2023, 10 Pages.
"Learning e-Glass," Retrieved from: https://web.archive.org/web/20210311184203/https://www.learning.glass/, Mar. 11, 2021, 6 pages.
Communication Pursuant to Rule 161(1) and 162 EPC, Received for European Patent Application No. 21824129.7, Mailed on Jul. 18, 2023, 03 Pages.
Final Office Action Issued in U.S. Appl. No. 17/323,618, Mailed Date Jan. 20, 2023, 17 Pages.
Hanselman, Scott, "Transparent Glass Whiteboard in Microsoft Teams or Zoom with OBS for FREE!," Retrieved. From: https://www.youtube.com/watch?v=oaikJCR6ec, Feb. 3, 2021, 5 Pages.
International Search Report and Written Opinion Issued in PCI Application No. PCT/US22/026246, Mailed on Aug. 3, 2022, 12 Pages.
Non-Final Office Action Issued in U.S. Appl. No. 17/323,618, Mailed Date: Jul. 20, 2022, 18 Pages.
Non-Provisional Application Filed in U.S. Appl. No. 17/115,433, filed Dec. 8, 2020, 75 Pages.
Notice of Allowance Issued in U.S. Appl. No. 17/323,618, Mailed Date: Jul. 24, 2023, 5 Pages.
Notice of Allowance Issued in U.S. Appl. No. 17/323,618, Mailed Date: Jun. 2, 2023, 22 Pages.
Stratvert, Kevin, "Top 5 Video Camera Hacks in Microsoft Teams", Retrieved from: https://www.youtube.com/watchv=1vCua6RGfA8, Feb. 12, 2021, 4 Pages.
Touchcastapp, "Introducing TouchCast," Retrieved from: https://www.youtube.com/watch?v=uyLK8N4ovdg, Jun. 27, 2013, 3 Pages.
Williams, Karen, "PowerPoint Tip—Adding a Whiteboard to your Presentation", Retrieved From: https://www.microassist.com/software-tips/PowerPoint-tip-adding-a-whiteboard-to-your-presentation/, Oct. 1, 2015, 2 Pages.

* cited by examiner

100

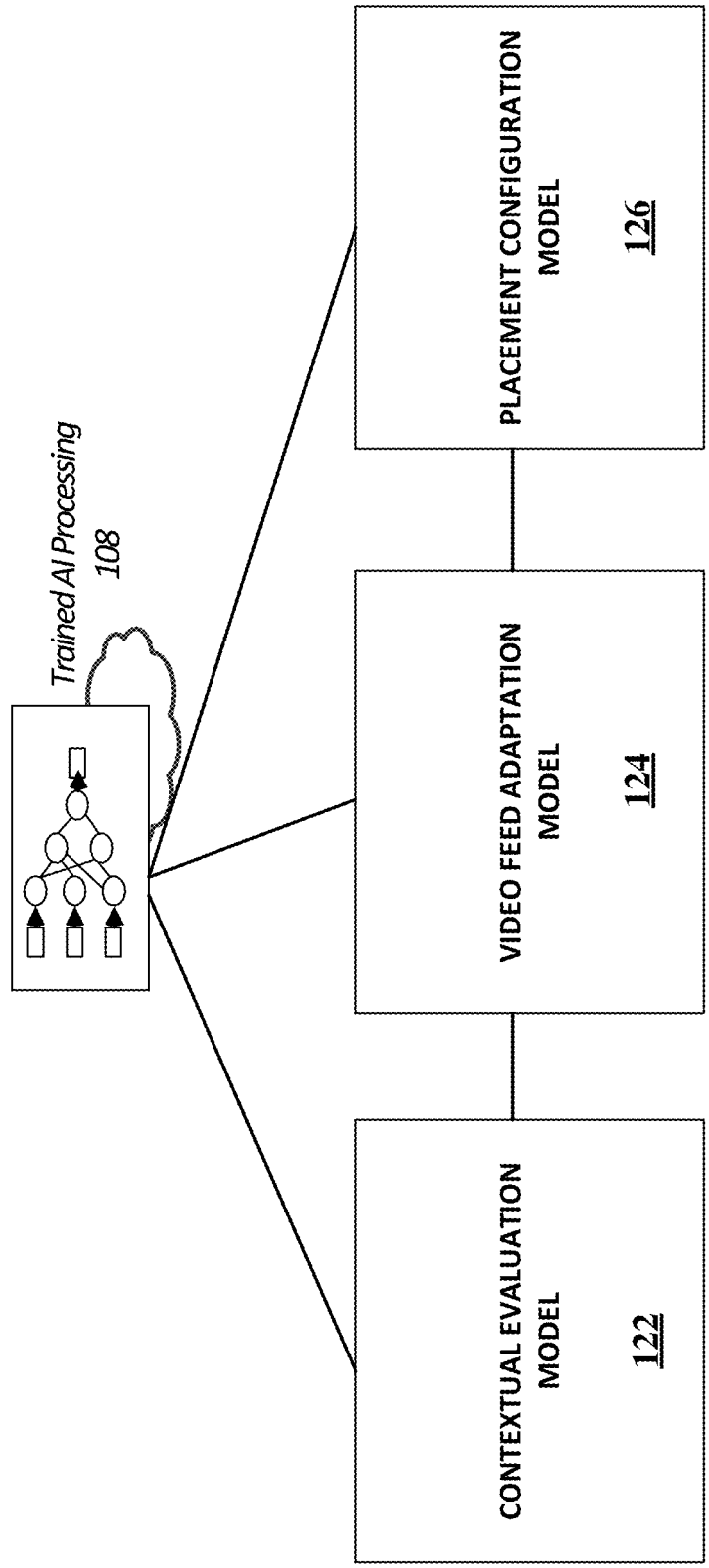

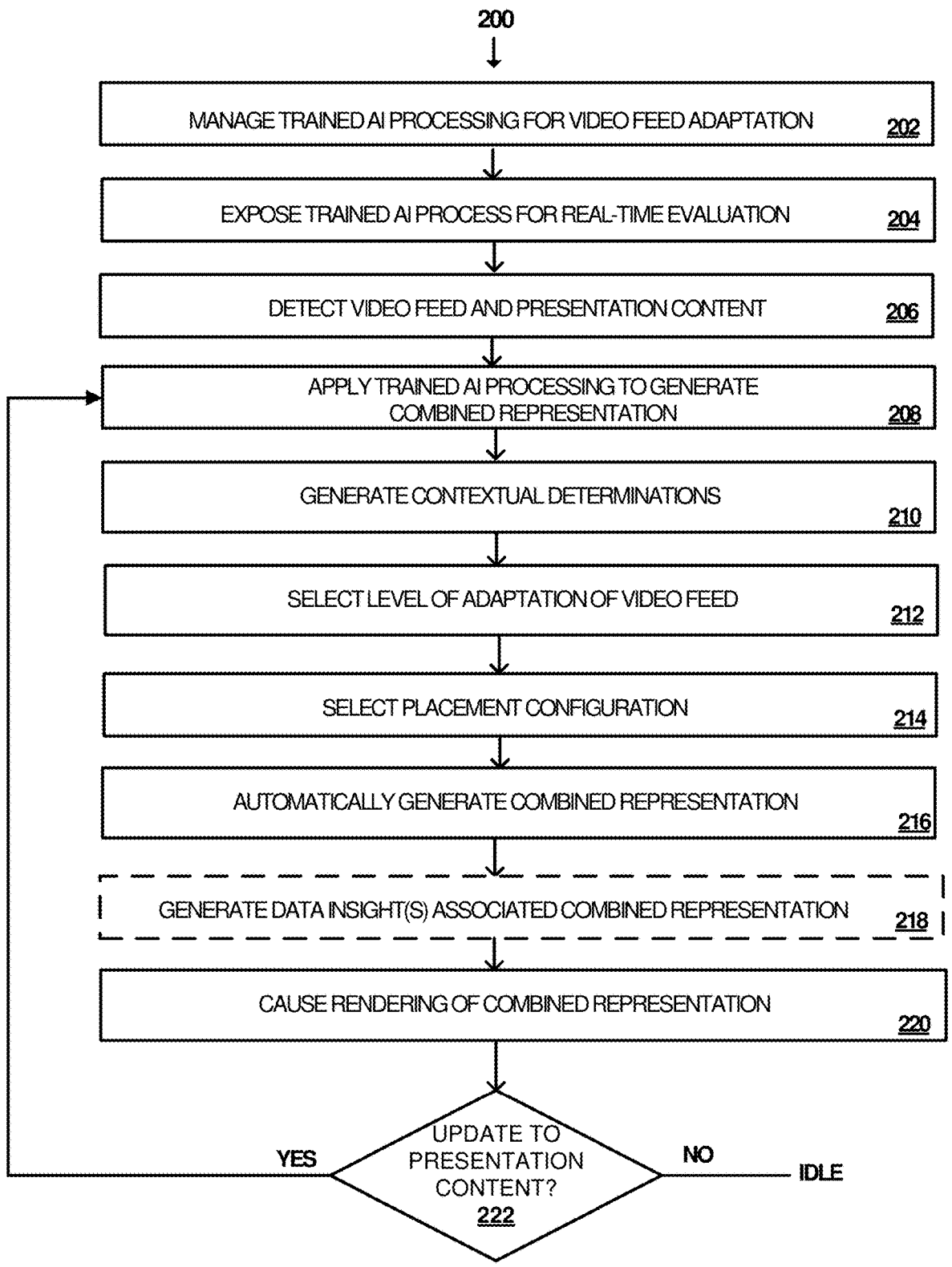

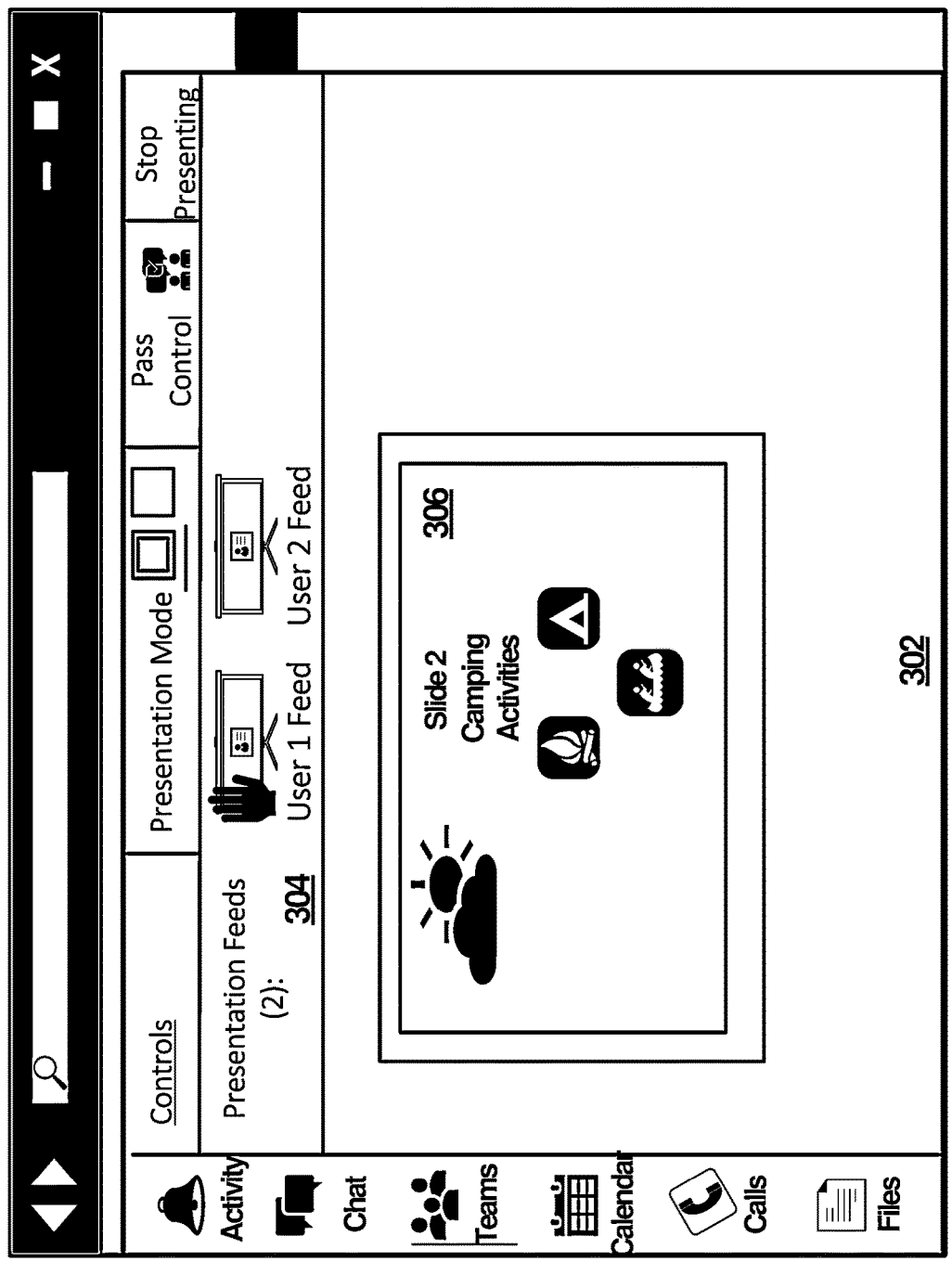

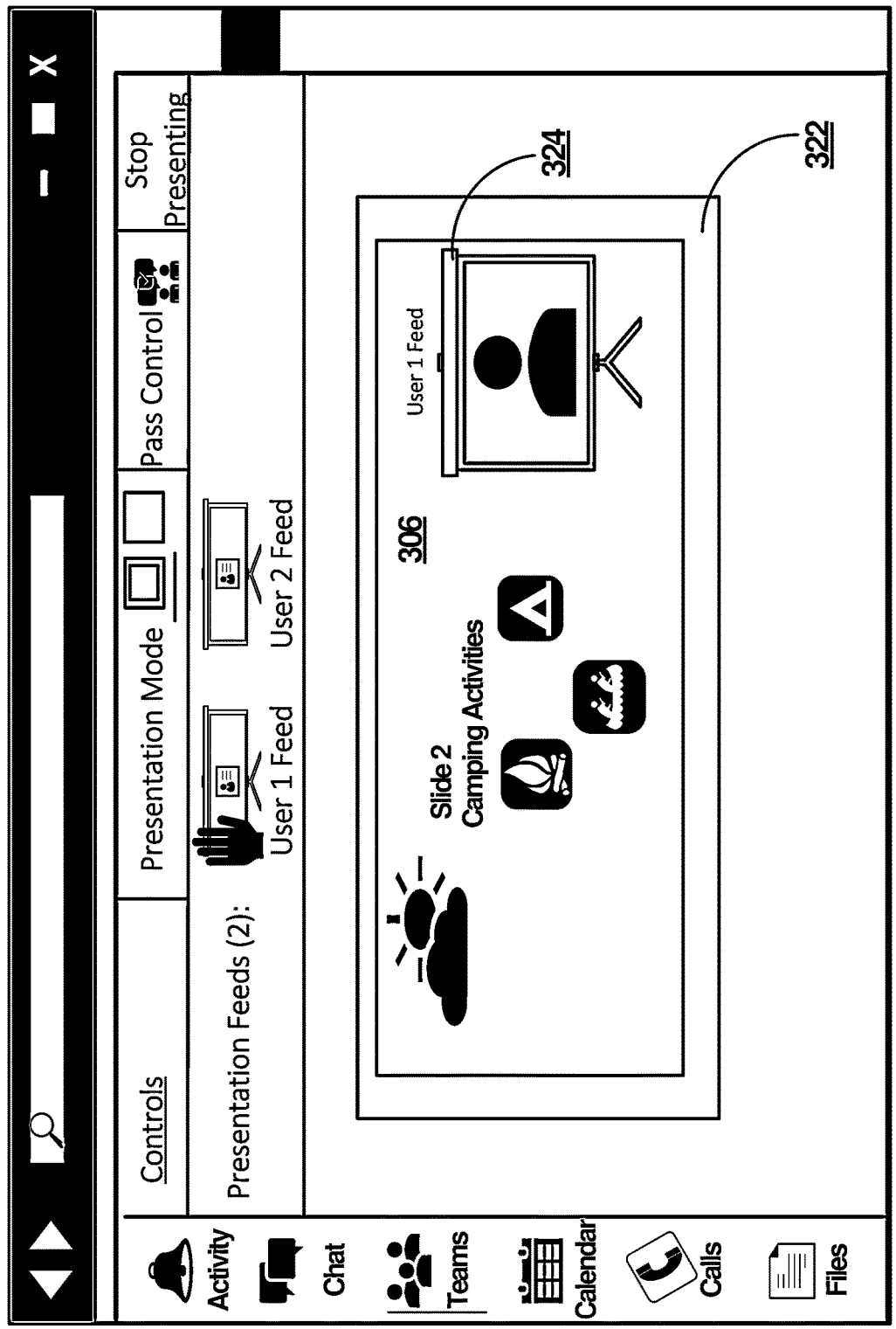

AUTOMATED ADAPTATION OF VIDEO FEED RELATIVE TO PRESENTATION CONTENT

BACKGROUND

With the recent surge in remote collaboration, remote meetings have become commonplace for connecting users. In many remote meetings, users are presenting content for other users to follow along with. This can present technical challenges as a video feed of a presenter is often separate from the presentation content that is being discussed during a presentation. For instance, presentation content such as slides may take up most of a viewable display space during a remote meeting while a video feed of a presenter is usually represented in only a tiny fraction of that allocated display space.

Users in a remote meeting may also struggle with determining where to focus their attention between a presenter feed or another content window such as one that presents presentation content. In some cases, missing even a sentence of what a presenter may have said can cause an audience member to miss the point a presenter is trying to convey. As an example, a participant may be reading a specific content of a slide and completely miss a critical explanation of that slide. This can even occur in instances where there are technical difficulties (i.e., connection issues).

Furthermore, technical challenges arise when attempting to manage display of a video feed relative to content that is concurrently being presented. A displayed video feed may obscure meaningful content of a presentation thereby making it difficult for participants to follow a presentation. This is especially true when applications fix a position and/or size of a video feed but the layout of presentation content changes. With remote meeting, a context of a presentation (e.g., a remote meeting) can change in an instant. However, traditional computing resources are not typically configured to manage interactions between video feeds and presented content, especially in instances where a focus of a video feed changes relative to content being presented. It stands that computing devices used for contextual monitoring can be configured to operate more efficiently to help improve monitoring of user communications such as presentations, remote meetings, etc.

Yet another technical challenge exists when considering how to incorporate a video feed from one application or service into content that is presented in another application or service. Traditional processing for presentation of a video feed can result in a poor framing, bad quality, etc. Applications or services often have varying levels of computing resources allocated to management of video feeds, whereby framing of a user (e.g., full body of user versus head region of user) as well as quality of a video feed may vary. As an example, a video feed application or service may not consider how to crop a video feed that will be presented in another application or service. It follows that traditionally used applications or services also fail to consider how to present a cropped video feed relative to the presentation content that the video feed is being displayed with.

SUMMARY

For resolution of the above identified technical problems, as well as other reasons, there is a technical need for application of artificial intelligence (AI) processing that manages automatic adaptation of one or more video feeds relative to presentation content. For example, trained AI processing automatically generates a combined representation comprising one or more video feeds and presentation content, where a video feed and/or presentation content is contextually modified relative to one another. A combined representation may comprise a modification of the one or more video feeds, objects of presentation content or a combination thereof. Exemplary trained AI processing executes analysis of a video feed to generate contextual determinations usable to understand how a video feed is displayed and what level of adaptation is necessary to optimize display of the video feed relative to presentation content. As a non-limiting example, a video feed may display multiple objects and need to be cropped to focus on a head (region) of a user who is speaking. In other instances, a video feed may already be framed properly, whereby trained AI processing can be managed efficiently by avoiding unnecessary processing. Additionally, size, formatting and/or placement position of a video feed and/or presentation content may also be modified based on a result of application of trained AI processing. A combined representation of one or more video feeds and presentation content is automatically generated (and subsequently rendered) based on a result of contextual evaluation of data associated with a video feed and data attributes associated with presentation content. Further non-limiting examples of the present disclosure extend to graphical user interface (GUI) management of combined representations through an adapted GUI of an application or service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1B illustrates an exemplary representation of AI processing adapted to generate a combined representation comprising one or more video feeds and presentation content, with which aspects of the present disclosure may be practiced.

FIG. 2 illustrates exemplary method related to automated generation and management of a combined representation comprising one or more video feeds and presentation content, with which aspects of the present disclosure may be practiced.

FIGS. 3A-3E illustrate exemplary processing device views associated with user interface examples for an improved user interface that is adapted for management of one or more video feeds relative to presentation content, with which aspects of the present disclosure may be practiced.

DETAILED DESCRIPTION

Figure 1A:
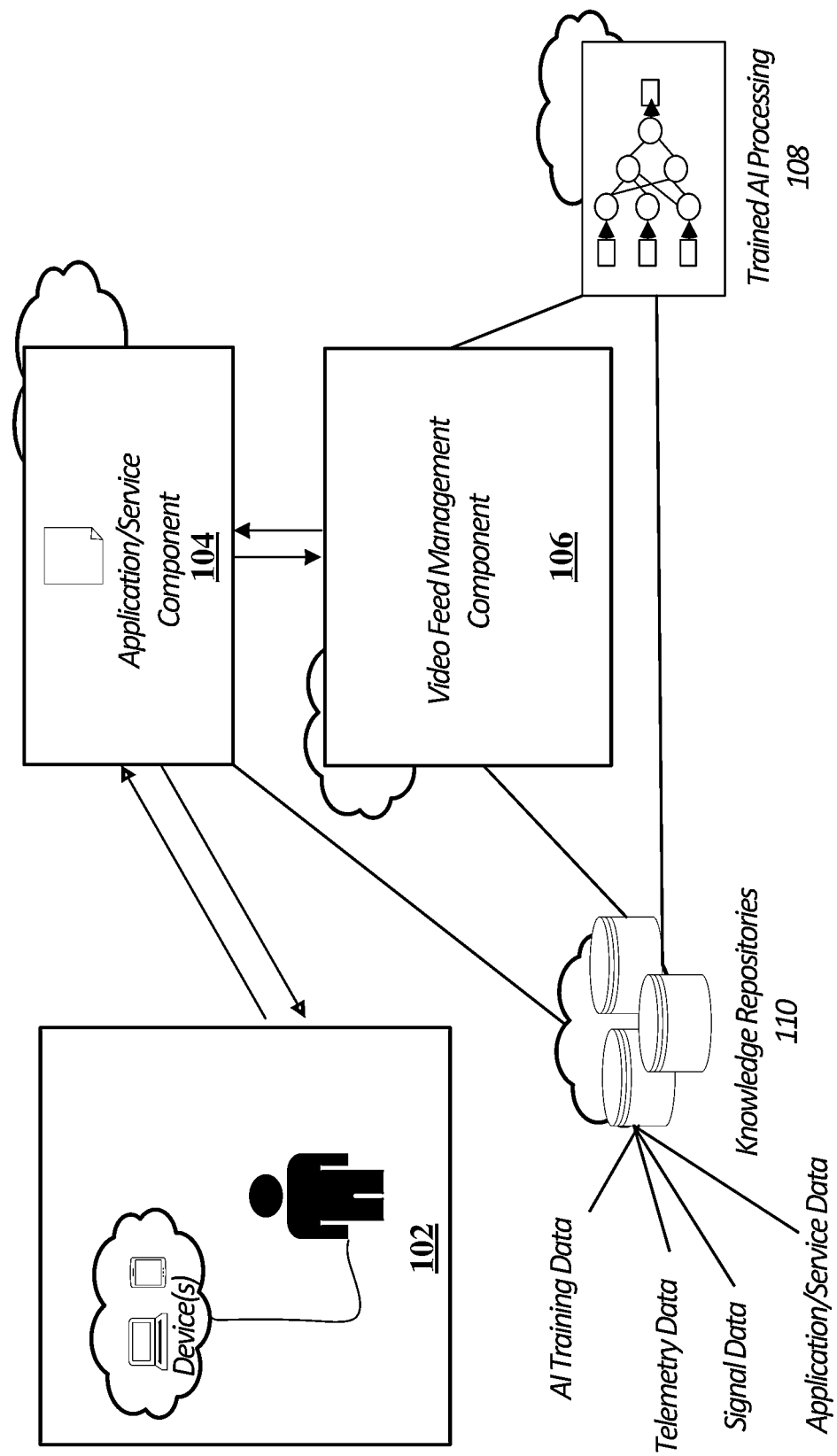
FIG. 1A illustrates an exemplary system diagram of components interfacing to enable automatic placement of one or more video feeds relative to presentation content, with which aspects of the present disclosure may be practiced.

As indicated in the foregoing, the present disclosure relates to application of AI processing that is adapted to manage automatic adaptation of one or more video feeds relative to presentation content. For example, trained AI processing automatically generates a combined representation comprising one or more video feeds and presentation content, where a video feed and/or presentation content is contextually modified relative to one another. A combined representation may comprise a modification of the one or more video feeds, objects of presentation content or a combination thereof, whereas a scope of a modification is determined based on a result of contextual analysis of a video feed relative to objects of presentation content. For instance, trained AI processing executes analysis of a video feed to generate contextual determinations usable to understand how a video feed is displayed and what level of adaptation is necessary to optimize display of the video feed relative to presentation content. As a non-limiting example, a video feed may display multiple objects and need to be cropped to focus on a head (region) of a user who is speaking. In other instances, a video feed may already be framed properly, whereby trained AI processing can be managed efficiently by avoiding unnecessary processing.

Additionally, size, formatting and/or placement position of a video feed and/or presentation content may also be modified based on a result of application of trained AI processing. Trained AI processing of the present disclosure is adapted to determine a placement configuration for the video feed relative to the presentation content, or visa-versa. Exemplary placement configurations identify an optimal size for display of a video feed and/or presentation content as well an optimal placement position of a video feed and/or presentation content. Placement configurations of the present disclosure are generated based on a comparative analysis of data associated with a state of a video feed (e.g., based on an identified level of adaptation for a video feed) relative to data attributes of objects within presentation content. A combined representation of one or more video feeds and presentation content is automatically generated. In one instance, trained AI processing is adapted to generate confidence scoring pertaining to a prioritization of presentation content, for example, to determine what types of presentation content objects are most important to a presentation (e.g., of a slide being displayed or to be displayed). This may yield an indicator as to how or whether to modify presentation content relative to a representation of a video feed. In some cases, it may be determined that presentation content should not be modified at all, where a representation of a video feed is layered in whitespace existing between objects of presentation content (e.g., a slide) or alternatively positioned proximate to presentation content.

With respect to presentation of a video feed relative to presentation content, the combined representation creates a layered representation that overlays a video feed over the presentation content according to the placement configuration. The combined representation (or a representation of a video feed) may then be rendered in a GUI of an application or service. In once technical instance, a video feed may already be displayed in a GUI of an application/service, where processing of the present disclosure is then utilized to update visual representation of a displayed video feed. For example, a size and/or placement position of the video feed may be modified in a GUI. In some alternative examples, only a representation of a video feed is modified based on analysis of an exemplary placement configuration. For instance, a representation of a video feed may be cropped, altered in size and/or placement position relative to the presentation content so as not to obscure any objects in the presentation content. This may occur based on a result of the contextual analysis including evaluation of a priority of specific objects of presentation content and whitespace available between objects within presentation content.

Presentation content is intended to cover any example where one or more content portions are inserted and arranged within a digital document or electronic file for presentation purposes. It is to be recognized that utility of the present disclosure extends to working with any type of electronic files or digital documents in which a live feed may be configurable as an inserted or embedded content portion. Types of electronic files and digital documents are known to one skilled in the field of art. As non-limiting examples, digital documents comprise but are not limited to: word processing documents; spreadsheet documents; notes documents; webpages; presentation documents (e.g., presentation slide, open canvas template); illustration documents (e.g., artboards, flowcharts, drawing documents); recording/editing documents (e.g., video or audio); messaging/email documents; and social networking objects (e.g., posts). For ease of explanation, reference is made to slide-based content (e.g., one or more slides) as presentation content. Slide-based content is intended to cover any example (e.g., linear or nonlinear) where one or more content portions are inserted and arranged within one or more templatized canvases, which are viewable as (or convertible to) a presentation document. In one example, slide-based content is a linear representation (e.g., presentation slide provided through a presentation application/service such as POWERPOINT®). For example, a representation of a live camera feed is embedded as content within a slide of a slide-based presentation. Another example of slide-based content is a nonlinear representation where an open canvas template is provided and manipulated (e.g., via zooming) to present content portions thereof. For example, a portion of an open canvas template can be zoomed-in on to provide a fractional representation of the open canvas template. The present disclosure further extends to technical instances where presentation content is created in one application or service and is presented in another application or service as part of a collaborative user communication (e.g., electronic meeting). For example, a user may create a slide-based presentation in a presentation application or service (e.g., POWERPOINT®) and subsequently present that slide-based presentation as part of an electronic meeting conducted in a collaborative communication application or service (e.g., MICROSOFT® TEAMS®).

Further non-limiting examples of the present disclosure extend to GUI management of combined representations through an adapted GUI of an application or service. As an example, once a representation of a video feed is automatically adapted relative to presentation content, a GUI of an application/service may further be adapted to present GUI features for control of an exemplary combined representation including one or more video feeds, presentation content, or a combination thereof. For instance, a GUI of an application/service is modified to provide a GUI menu providing GUI features for control of an exemplary combined representation. Among other features, a GUI menu configured to provide control over a combined representation. Non-limiting examples of such GUI features enable control over one or more of the following: a size of a representation of a video feed relative to presentation content (e.g., maximize a size of a video feed in the combined representation); emphasis on presentation content in the combined representation (e.g., temporarily during a point in a presentation); automatic display of effects to a video feed to emphasize presentation content; fixing display of video feeds relative to changes in presentation content; and disjoining of a combined representation, among other examples. Visual effects (e.g., animations, callouts) may be added to a representation of video feed based on a result of contextual analysis of presentation content. In one example, visual effects may be automatically applied to a representation of a video feed to help emphasize presentation content being presented and/or presentation of the same may be initiated by users through selection of GUI features (e.g., of a GUI menu configured to manage a combined representation).

In further examples of the present disclosure, trained AI processing is adapted to continuously update representation of one or more video feeds based on changes to presentation content. Consider a technical instance where presentation content is a slide-based presentation. As slide content changes, a representation of a video feed (e.g., in a combined representation) may also need to be modified. For example, more (or less) whitespace may be available in a displayed slide, where a size and/or layout position of a video feed or objects of presentation content may be modified to optimize display. In further instances, content of a video feed may be changed where a size of a video feed may need to be modified. As an example, an additional speaker may be added to a displayed video feed or additional video feeds may be added as presenters for presentation content. In any case, trained AI processing is continuously applied to automatically update an exemplary combined representation or alternatively a representation of a video feed.

In one non-limiting example, a computing device transformed, as compared with a general-purpose computing device, to execute computer-implemented method. A video feed is detected. One or more video feeds may be detected from computing devices (e.g., user computing devices) through interfacing between host applications/services where examples of exemplary host applications/services are subsequently described in the present disclosure. In one example, a video feed is presented concurrently with presentation content in a GUI of a presentation application/service. In another example, one or more video feeds and/or presentation content is presented in a collaborative communication application/service. For instance, users may be utilizing the collaborative communication application/service to conduct a remote electronic meeting that comprises presentation of one or more video feeds and presentation content.

Once one or more video feeds and presentation content are detected, trained AI processing is automatically applied that is adapted to generate a combined representation of the video feed with the presentation content of the presentation application or service. In one example, trained AI processing comprises a hybrid AI model (e.g., hybrid machine learning model) that is adapted and trained to execute a plurality of processing operations described in the present disclosure. In alternative examples, trained AI processing comprises a collective application of a plurality of trained AI models (e.g., 3 trained AI models) that are separately trained and managed to execute processing described herein. In examples where a plurality of independently trained and managed AI models is implemented, downstream processing efficiency is improved by an ordered application of trained AI models where processing results from earlier applied AI models can be propagated to subsequently applied AI models. For example, a trained AI model may evaluate a level of cropping of a video feed as presently displayed, which may then be utilized to dictate a level of adaptation or modification applied to a video feed for generation of a combined representation in a preferred application or service (e.g., collaborative communication application/service that is used to conduct a remote electronic meeting).

In one example, trained AI processing executes processing operation that comprise generating contextual determinations for combining the video feed with the presentation content based on analysis of the video feed. Exemplary contextual determinations comprise a cropping determination indicating whether the video feed is cropped to focus on a head of at least one user. In alternative examples, other regions of interest (e.g., identified objects) may be set by developers without departing from the spirit of the present disclosure. Trained AI processing (e.g., a first trained AI model) executes image segmentation of at least one frame of the video feed to determine one or more regions of interest in the at least one frame of the video feed. In an example where a head of a user is a region of interest, an exemplary cropping determination determines whether the video feed is cropped to display the head of the at least one user based on analysis of the one or more regions of interest in the at least one frame. Developers may specify one or more regions of interest pertaining to a cropping determination. Contextual determinations of the present disclosure are not limited to cropping determinations. In some examples, trained AI processing is configured to execute analysis on additional types of contextual determinations that can be used to aid subsequent execution of trained AI processing and ultimately aid generation of a combined representation. For example, contextual determinations, generated by the first trained AI model may comprise: a size determination indicating a size of the video feed; a video resolution determination indicating a video resolution of the video feed; an aspect ratio of a video feed; and a frame rate determination indicating a frame rate of the video feed, among other examples. Such contextual determinations may assist an application or service with managing a representation of a video feed to meet the processing standards (or requirements) for presenting content. For instance, an application/service from which a camera feed is imported may present content (e.g., video feeds) at specific quality level where resolution and/or frame rate may need to be adjusted to meet quality standards (or requirements) of an application/service that is to render a modified representation of the video feed (e.g., an exemplary combined representation).

Moreover, trained AI processing executes processing operation that comprise selecting a level of adaptation of a video feed to focus on one or more regions of interest. Levels of adaptation pertain to developer set determinations as to how much a video feed is required to be modified for inclusion in an exemplary combined representation. For instance, a video feed may be adequately cropped on a predetermined region of interest (e.g., a head of a user) and require no cropping modification. In another example, a video feed may be a full body representation of a user that requires cropping modification to focus on a head of a user for inclusion of the video feed in a combined representation. In some alternative examples, additional types of contextual determinations may also correspond to levels of adaptation of a video feed. For instance, a resolution and/or frame rate of a video feed may need to be modified to meet quality standards (or requirements) of an application/service that is presenting the combined representation. Developers may pre-set levels of adaptations pertaining to one or more contextual determinations previously described. That is, a level of adaptation of a video feed is selected based on analysis of exemplary contextual determinations including a cropping determination. Exemplary contextual determinations (e.g., generated by an exemplary first trained AI model) may be propagated to a second trained AI model or second part of a hybrid AI model that is adapted to select a level of adaptation of a video feed. In specific instances where a level of adaptation of a video feed pertains to a level of cropping of a video feed, a second trained AI model is adapted to manage cropping of the video feed for combination with the presentation content.

As previously indicated, one example of a region of interest is a head region of a user. As an example, a head region of a user may comprise a preset number of pixels surrounding (or relative to an identified head (or face) of a user. For instance, a preset number of pixels surrounding a head of a user may be identified to include a head of a user, neck, upper body, surrounding background, etc. A level of adaptation of a video feed may be set pertaining to a cropping determination (e.g., executed by a first trained AI model or first part of a hybrid AI model). For example, a level of adaptation of a video feed is selected based on analysis of the cropping determination indicating whether (or not) the video feed is cropped on a head of at least one user (e.g., a head region of a user). In one technical instance, a level of adaptation of a video feed is a determination that no modification or adaptation is required to the video feed. In one specific example where a cropping determination is used as a basis for selecting a level of adaptation, a level representing no modification is selected, effectively bypassing any cropping of the video feed when the cropping determination indicates that the video feed is already cropped to focus on the head (region) of at least one user. This information can be useful to improve processing efficiency of trained AI processing where an AI model (e.g., second trained AI model) specifically trained to modify a video feed (e.g., crop a video feed) is able to be bypassed when it is determined that a video feed requires no additional modification (e.g., is adequately cropped) for the purpose of generating a combined representation. In another technical instance, a level of adaptation of a video feed is a determination that a modification or adaptation is required to the video feed. In one specific example where a cropping determination is used as a basis for selecting a level of adaptation, a level representing modification (or adaptation) of a video feed is selected when the cropping determination indicates that the video feed requires cropping to focus on the head (region) of at least one user. Additional designations of levels of modifications may also be introduced depending on the type of contextual determinations that trained AI processing is adapted to focus on. For instance, if contextual determinations indicate that a quality of a video feed needs to be modified, additional designations as to a level of modification (or adaptation) are required beyond just whether a video feed is appropriately cropped on a region of interest. Data pertaining to a selected level of adaptation of a video feed, including data indicating specific modifications (or adaptations) to a video feed pertaining to cropping, quality, etc., may be propagated to a third trained AI model or third part of a hybrid AI model that is adapted to manage placement of the video feed relative to the presentation content.

Additionally, trained AI processing is further adapted to select a placement configuration for the video feed relative to the presentation content based on a comparative analysis of the data associated with the level of adaption of the video feed and data attributes of objects within the presentation content. In examples where a plurality of trained AI models is interfacing to collectively generate a combined representation, a third trained AI model may be adapted to manage placement of a video feed relative to objects associated with presentation content. As previously indicated, exemplary placement configurations identify an optimal size for display of a video feed and/or presentation content as well an optimal placement position of a video feed and/or presentation content. Placement configurations of the present disclosure are generated based on a comparative analysis of data associated with a state of a video feed (e.g., data identified pertaining to a level of adaptation for a video feed) relative to data attributes of objects within presentation content. For example, data (and metadata) associated with presentation content (e.g., a slide) is analyzed to determine data attributes pertaining to presentation content including data attributes of specific objects individually as well as relative to one another. Analysis of data associated with presentation content comprises analyzing data attributes indicating one or more of: a layout of objects within specific presentation content (e.g., a slide); object types within specific presentation content; object size(s) of corresponding objects associated within the specific presentation content; and spacing between objects within specific presentation content, among other examples. Applying trained AI modeling to analyze data and/or metadata of objects associated with presentation content identifies relationships (quantitative and/or qualitive) between objects as well as determinations as to applicable whitespace within specific presentation content, for example, between and/or around objects of the specific presentation content. This can help identify optimal size options and placement position options for presenting a representation of a video feed as part of a combined representation.

Furthermore, selection of a placement position comprises analyzing data associated with video feed comprising data associated with a level of adaptation of a video feed for generation of a combined representation. Using trained AI processing (e.g., a trained machine learning model) size attributes of a video feed may be correlated with exemplary data attributes analyzed pertaining to objects of presentation content. In one example, confidence scoring metrics are then generated to identify candidate placement positions for a representation of a video feed relative to presentation content based on available whitespace corresponding with a layout of objects within specific presentation content and a determined size of a representation of a video feed (e.g., a state of a video feed after cropping determinations and any subsequent modification). Developers may apply rules (e.g., business rules) for selecting an optimal placement position for a representation of a video feed based on a result of analyzing exemplary confidence scoring. For instance, a highest scoring candidate placement position is selected for a representation of a video feed in a combined representation.

In other examples, an optimal size of a representation of a video feed is not determined until a contextual evaluation is executed between data associated with a representation of a video feed and data attributes of presentation content. For instance, a comparative evaluation of data associated with a video feed and data attributes of objects of presentation content (e.g., of a slide) yield determinations as to a size of a representation of a video feed as well as a layout position of the representation of the video feed. Confidence scoring can be generated for determining candidate placement positions, where a size and layout position of a representation of a video feed is determined (and may vary) as part of individual candidate placement positions. Similar to previous examples, developers may apply rules (e.g., business rules) for selecting an optimal placement position, where applied rules may consider both a layout position of the representation of the video feed as well as a size. For instance, a larger size of a video feed may be preferred in some technical instances. In other instances, the type of data object (or importance of the data objects within specific presentation content) may factor into where/how a representation of a video feed is to be presented. In some additional examples, trained AI processing (e.g., a third trained AI model) is further adapted to generate confidence scoring pertaining to a prioritization of objects.

As previously indicated, a prioritization analysis may be executed to rank a priority of content portions (e.g., objects) within specific presentation content. Prioritization analysis of presentation content may help yield determination as to what is the most important content within specific presentation content as well as what objects are the least important. This type of contextual analysis can not only help select an optimal placement position of a representation of a video feed when keeping objects of presentation content at fixed positions, but also can be used to determine how a layout of objects of presentation content can be rearranged to optimize a combined representation. In one example, it may be optimal to place a representation of a video feed next to the most important objects of presentation content, as determined from a prioritization analysis, even in instances where a size of a representation of a video feed may be smaller than that of another candidate placement position. In any instance, application of trained AI processing creates data-driven results that may present a plurality of candidate placement positions. Analysis of results from application of trained AI processing may help developers set rules for selection of an optimal placement configuration as well as parameters to focus on for selection of an optimal placement position.

Trained AI processing (e.g., a third trained AI model) is then configured to automatically generate a combined representation of the video feed and the presentation content based on analysis of a selected placement configuration. In some alternative examples, a selected placement configuration is utilized to modify only a representation of a video feed relative to presentation content. As an example, generation of the combined representation comprises creation of a layered representation of a video feed relative to the presentation content, where a representation of a video feed overlays presentation content according to the placement configuration. Further, as referenced in the foregoing description, a representation of a video feed (e.g., within a combined representation) focuses on a specific region of interest. In an example where a region of interest is a head (region) of a user, the combined representation is rendered to have the video feed focus on the head of at least one user. In technical instances where multiple users are displayed in a video feed, a video feed in a combined representation may be cropped to focus on the heads of the multiple users.

A representation of a video feed or an exemplary combined representation is then caused to be rendered within a GUI of an application/service, for example, that is presenting the presentation content and one or more video feeds. As a non-limiting example, presentation content is a slide of slide-based presentation content, where an exemplary placement configuration for the video is selected for the slide of the slide-based presentation content. In an example where presentation content is a slide-based presentation (e.g., a slide-based presentation deck), presentation content may change a presentation shifts to new slides. As previously indicated, processing of the present disclosure can be continuously applied to provide updated representations of a video or combined representations. For instance, a change is detected to display of a slide-based presentation content, where the presentation content changes from display of the slide to display of a second slide of the slide-based presentation content. In response to detecting the change to display of the slide-based presentation content, an updated placement configuration for the video feed relative to the presentation content of the second slide is selected. For example, a third trained AI model executes processing to select a placement configuration for a representation of a video feed and/or objects of presentation content of a newly displayed slide. As such, an updated placement configuration is selected based on a comparative analysis of the data associated with the level of adaption of the video feed and data attributes of objects within the second slide. A representation of a video feed or a combined representation of the video feed and the presentation content is then automatically updated so that the video feed the second slide according to the updated placement configuration. This process may repeat for additional presentation content (e.g., additional slides of a slide-based presentation deck). Processing efficiency for generating updated placement configurations is greatly improved by already having optimized a video feed for rendering in a combined representation. For instance, trained AI processing understands that it has an optimized video feed that does not need to be cropped again, thereby focusing contextual evaluation on a comparative evaluation of a representation of a video feed relative to new presentation content.

Exemplary technical advantages provided by processing described in the present disclosure comprise but are not limited to: ability to intelligently determine when and how to crop video feeds; automatic adaptation of video feeds relative to presentation content; generation and application of novel trained AI processing that is adapted to automatically adapt a representation of a video feed and/or presentation content based on a result of contextual analysis; improved processing efficiency (e.g., reduction in processing cycles, saving resources/bandwidth) for computing devices when generating representations of video feeds relative to presentation content; reduction in latency through efficient processing operations that enable automatic adaptation of video feeds relative to presentation content; provision of an improved GUI adapted to provide GUI features for management of exemplary combined representations; ability to adapt trained AI processing to generate different versions of trained AI models (e.g., lightweight modeling versus robust modeling) for application in different contextual scenarios (e.g., processing with different host applications/services); and improved usability of host applications/services for users via integration of processing described herein, among other technical advantages.

FIG. 1A illustrates an exemplary system diagram 100 of components interfacing to enable automatic placement of one or more video feeds relative to presentation content, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in representation 120 (FIG. 1B), method 200 (FIG. 2) as well as processing described in and associated with visual diagrams of FIGS. 3A-3E and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service (e.g., host service). Exemplary services may be managed by a software data platform that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises user computing devices 102; an application/service component 104; a video feed management component 106; a component for implementation of trained AI processing 108; and knowledge repositories 110.

System diagram 100 comprises user computing device(s) 102. An example of a user computing device 102 is a computing system (or computing systems) as described in the description of FIG. 4. In one example, user computing device(s) 102 are intended to cover examples where a computing device is a client computing device that is executing an application or service configured to enable management of presentation content including collaboration between users. In alternative examples, a user computing device 102 may be one or more computing devices that are used by developers to execute processing for training exemplary AI processing and/or applying trained AI processing to manage a state of a video feed relative to presentation content including generation of exemplary combined representations. For instance, one or more user computing devices 102 may be adapted to execute processing operations of the video feed management component 106 and/or a component for implementation of trained AI processing 108.

As previously referenced, presentation content is intended to cover any example where one or more content portions are inserted and arranged within a digital document or electronic file for presentation purposes. It is to be recognized that utility of the present disclosure extends to working with any type of electronic files or digital documents in which a live feed may be configurable as an inserted or embedded content portion. Types of electronic files and digital documents are known to one skilled in the field of art. As non-limiting examples, digital documents comprise but are not limited to: word processing documents; spreadsheet documents; notes documents; webpages; presentation documents (e.g., presentation slide, open canvas template); illustration documents (e.g., artboards, flowcharts, drawing documents); recording/editing documents (e.g., video or audio); messaging/email documents; and social networking objects (e.g., posts). For ease of explanation, reference is made to slide-based content (e.g., one or more slides) as presentation content. Slide-based content is intended to cover any example (e.g., linear or nonlinear) where one or more content portions are inserted and arranged within one or more templatized canvases, which are viewable as (or convertible to) a presentation document. In one example, slide-based content is a linear representation (e.g., presentation slide provided through a presentation application/service such as POWERPOINT®). For example, a representation of a live camera feed is embedded as content within a slide of a slide-based presentation. Another example of slide-based content is a nonlinear representation where an open canvas template is provided and manipulated (e.g., via zooming) to present content portions thereof. For example, a portion of an open canvas template can be zoomed-in on to provide a fractional representation of the open canvas template. The present disclosure further extends to technical instances where presentation content is created in one application or service and is presented in another application or service as part of a collaborative user communication (e.g., electronic meeting). For example, a user may create a slide-based presentation in a presentation application or service (e.g., POWERPOINT®) and subsequently present that slide-based presentation as part of an electronic meeting conducted in a collaborative communication application or service (e.g., MICROSOFT® TEAMS®).

Furthermore, user computing device(s) 102 may be specifically configured to enable users to provide video feeds (e.g., live camera feeds) during a presentation of presentation content. User computing device(s) 102 may comprise components such as a video camera (e.g., webcam) and a microphone, which may be utilized to establish a camera feed through an application or service. A video feed as described herein is intended to cover any example where one or more content streams, including a video stream, are presented over an electronic medium. For example, a video feed covers technical instances where one or more data streams (e.g., including a live video stream) are broadcast (e.g., over a network connection) and/or provided as output through a computing device and/or computer program. Furthermore, a video feed as described herein is further configured to process additional data types (e.g., audio data) as a stream (e.g., audio stream) to cohesively represent a presentation state of a user and/or computing device. Processing for rendering and presenting data streams and types of data streams that may be included in a video feed are known to one skilled in the field of art. Above what is traditionally, known the present disclosure describes novel processing for working with video feeds including ways in which they are integrated within presentation content (e.g., a slide-based presentation). In one example, a novel combined representation is generated that comprises a representation of a video feed that is adapted relative to presentation content. Further improvements over traditional systems are reflected through contextual analysis of presentation content and adaptation of video feeds for presentation content, as well as improved GUIs in applications/services for managing representations of video feeds including in exemplary combined representations.

The application/service component 104 is one or more computer components (hardware, software or a combination thereof) configured to manage host applications/services and associated endpoints. The application/service component 104 interfaces with other computer components of system diagram 100 to enable management of presentation content through remote collaboration of users (e.g., managed via interaction of one or more host applications/services). The application/service component 104 is further configured to present, through interfacing with other computer components of system diagram 100, an adapted GUI that provides user notifications, GUI menus, GUI elements, etc., to manage adaptation of video feeds and/or presentation content including generation and rendering of exemplary combined representations. Non-limiting examples of host applications/ services that are applicable in the present disclosure, including integration within exemplary software data platforms, comprise but are not limited to: open-source collaborative framework applications/services; video conferencing applications/services; word processing applications/services; spreadsheet applications/services; notes/notetaking applications/services; authoring applications/services; digital presentation applications/services; presentation broadcasting applications/services; search engine applications/services; email applications/services; messaging applications/services; web browsing applications/services; collaborative communication applications/services; digital assistant applications/services; webpage building applications/service; directory applications/services; mapping applications/services; calendaring applications/services; electronic payment applications/services; digital data storage or distributed data storage applications/services; web conferencing applications/services; call communication applications/services; language understanding applications/services; bot framework applications/services; networking applications/services; educational information management applications/ services; social networking applications/services; and suites of applications/services that may collectively comprise a combination of one or more of the previously mentioned applications/services, among other examples. The application/service component 104 further manages respective endpoints associated with individual host applications/services, which have been referenced in the foregoing description. In some examples, an exemplary host application/service may be a component of a distributed software platform providing a suite of host applications/services and associated endpoints. A distributed software platform is configured to providing access to a plurality of applications/services, thereby enabling cross-application/service usage to enhance functionality of a specific application/service at run-time. For instance, a distributed software platform enables interfacing between a host service related to management of a distributed collaborative canvas and/or individual components associated therewith and other host application/service endpoints (e.g., configured for execution of specific tasks). Distributed software platforms may further manage tenant configurations/user accounts to manage access to features, applications/services, etc. as well access to distributed data storage (including user-specific distributed data storage). Moreover, specific host application/services (including those of a distributed software platform) may be configured to interface with other non-proprietary application/services (e.g., third-party applications/services) to extend functionality including data transformation and associated implementation.

The application/service component 104 is further configured to present, through interfacing with other computer components of system 100, an adapted GUI that provides user notifications, GUI menus, GUI features, etc., related to the provision of adapted (or modified) representations of video feed relative to presentation content including in examples where a combined representation of presentation content and one or more video feeds is rendered. In other instances, an application command control (e.g., user interface ribbon and/or GUI menu) may be adapted to include selectable user interface features related to management of representations of video feeds relative to presentation content. Non-limiting visual examples of an improved GUI, and GUI elements provided therein, are provided in FIGS. 3A-3E.

Furthermore, the present disclosure is further adapted to enable trained AI processing to further contemplate other types of signal data that may be collected through various host applications/services by the application/service component 104. For instance, application of trained AI processing (e.g., one or more trained machine learning models may be adapted to evaluate not only data associated with presentation content and video feeds but other types of contextual data including past and/or current user actions, user preferences, application/service log data, etc., that are each associated with one or more user accounts. This additional signal data analysis may help yield determinations as to how (and/or when) to generate representations of video feeds, combined representations, data insights and/or updates to generated representation (e.g., combined representations) including the provision of visual effects. Non-limiting examples of signal data that may be collected and analyzed comprises but is not limited to: device-specific signal data collected from operation of one or more user computing devices; user-specific signal data collected from specific tenants/user-accounts with respect to access to any of: devices, login to a distributed software platform, applications/services, etc.; application-specific data collected from usage of applications/services and associated endpoints; or a combination thereof. Analysis of such types of signal data in an aggregate manner may be useful in helping generate contextually relevant determinations, data insights, etc. Analysis of exemplary signal data may comprise identifying correlations and relationships between the different types of signal data, where telemetric analysis may be applied to generate determinations with respect to a contextual state of user activity with respect to different host application/ services and associated endpoints. Analyzing of signal data, including user-specific signal data, occurs in compliance with user privacy regulations and policies. For instance, users may consent (or opt-in) to monitoring of signal data to improve user experience and operation of applications/ services associated with a software data platform.

The video feed management component 106 is one or more computer components (hardware, software or a combination thereof) configured to execute and manage processing operations related to automatic adaptation of video feeds and/or presentation content based on a result of contextual analysis by trained AI processing. The video feed management component 106 is configured to execute any processing operations described herein, including those described relative to system diagram 100 (FIG. 1A), representation 120 (FIG. 1B), method 200 (FIG. 2), and processing associated with visual diagrams of FIGS. 3A-3E and further described in the accompanying description. It is further to be recognized that an order of execution of processing operations by the video feed management component 106 may vary without departing from the spirit of the present disclosure.

As referenced in the foregoing description, the video feed management component 106 and/or the application/service component 104 are configured to interface with a component for implementation of trained AI processing 108 to aid processing in various contextual scenarios. The component for implementation of trained AI processing is configured to manage implementation of one or more trained AI models. Implementation of trained AI modeling including creating, adapting, training, and updating of trained AI processing is known to one skilled in the field of art. Trained AI processing is applicable to aid any type of determinative or predictive processing including specific processing operations described about with respect to determinations, classification ranking/scoring and relevance ranking/scoring. Moreover, a component for implementation of trained AI processing 108 may be applied to aid generation of processing determinations of other components of system diagram 100. An exemplary component for implementation trained AI processing 108 may manage AI modeling including the creation, training, application, and updating of AI modeling. In cases where trained AI processing is applied, general application of trained AI processing including creation, training and update thereof is known to one skilled the field of art. Above what is traditionally known, trained AI processing may be adapted to execute specific determinations described herein with reference to any component of system diagram 100 and processing operations executed thereby. For instance, an AI model may be specifically trained and adapted for execution of processing operations comprising but not limited to: analyzing data (and metadata) associated with presentation content and one or more video feeds; generating contextual determinations for combining the video feed with the presentation content based on analysis of the video feed including generation of cropping determinations; selection of a level of adaptation of a video feed; selecting a placement configuration for a video feed relative to presentation content; generation of adapted representation of a video feed and/or presentation content such as an exemplary combined representation; and generating data insights pertaining to management of an adapted representation of a video feed or combined representation, among other examples. Exemplary AI processing may be applicable to aid any type of determinative or predictive processing by any components of system diagram 100, via any of: supervised learning; unsupervised learning; semi-supervised learning; or reinforcement learning, among other examples. In one example, trained AI processing comprises a hybrid AI model (e.g., hybrid machine learning model) that is adapted and trained to execute a plurality of processing operations described in the present disclosure. In alternative examples, trained AI processing comprises a collective application of a plurality of trained AI models (e.g., 3 trained AI models) that are separately trained and managed to execute processing described herein. In examples where a plurality of independently trained and managed AI models is implemented, downstream processing efficiency is improved by an ordered application of trained AI models where processing results from earlier applied AI models can be propagated to subsequently applied AI models. For example, a trained AI model may evaluate a level of cropping of a video feed as presently displayed, which may then be utilized to dictate a level of adaptation or modification applied to a video feed for generation of a combined representation in a preferred application or service (e.g., collaborative communication application/service that is used to conduct a remote electronic meeting). A non-limiting example of AI processing using multiple trained AI models is described in representation 120 (FIG. 1B). In any instance, application of trained AI processing creates data-driven results that can be further analyzed to optimally manage a state of a video feed relative to presentation content even in technical instances where presentation content continuously changes.

Non-limiting examples of supervised learning that may be applied comprise but are not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, a component for implementation of trained AI processing 108 may be configured to apply a ranker to generate relevance scoring to assist with any processing determinations with respect to any relevance analysis described herein. Non-limiting examples of relevance scoring, and specific metrics used for relevance scoring have been referenced in the foregoing description and are subsequently described including the description of method 200 (FIG. 2). Scoring for relevance (or importance) ranking may be based on individual relevance scoring metrics described herein or an aggregation of said scoring metrics. In some alternative examples where multiple relevance scoring metrics are utilized, a weighting may be applied that prioritizes one relevance scoring metric over another depending on the signal data collected and the specific determination being generated. Results of a relevance analysis may be finalized according to developer specifications. This may comprise a threshold analysis of results, where a threshold relevance score may be comparatively evaluated with one or more relevance scoring metrics generated from application of trained AI processing.

Knowledge repositories 110 may be accessed to manage data aiding operation of any other computer components described in system diagram 100. Knowledge resources comprise any data affiliated with a software application platform (e.g., Microsoft®, Google®, Apple®, IBM®) as well as data that is obtained through interfacing with resources over a network connection including third-party applications/services. Knowledge repositories 110 may be resources accessible in a distributed manner via network connection that may store data usable to improve processing operations described herein. Examples of data maintained by knowledge repositories 110 comprises but is not limited to: generated combined representations; data insights and GUI notifications; collected signal data (e.g., from usage of an application/service, device-specific, user-specific); telemetry data including past and present usage of a specific user and/or group of users; data for execution of application/services including host application/services and associated endpoints; corpuses of annotated data used to build and train AI processing classifiers for trained AI modeling; access to entity databases and/or other network graph databases usable for evaluation of signal data; web-based resources including any data accessible via network connection including data stored via distributed data storage; trained bots including those for natural language understanding; software modules and algorithms for contextual evaluation of content and metadata; and application/service data (e.g., data of applications/services managed by the application/service component 104) for execution of specific applications/services including electronic document metadata, among other examples. In even further examples, telemetry data may be collected, aggregated and correlated (e.g., by an interfacing application/service) to further provide computer components of system diagram 100 with on demand access to telemetry data which can aid determinations generated thereby.

FIG. 1B illustrates an exemplary representation 120 of AI processing adapted to generate a combined representation comprising one or more video feeds and presentation content, with which aspects of the present disclosure may be practiced. As indicated in the foregoing trained AI processing may comprise a hybrid trained AI model (e.g., trained machine learning model) that collectively executes processing operations described herein or a plurality of trained AI models (e.g., plurality of trained machine learning models) that are each individually adapted for a specific technical purpose. Representation 120 of FIG. 1B illustrates a technical instance where 3 separate AI models are each adapted to execute a specific segment of processing to ultimately generate a combined representation of one or more video feeds and presentation content. For example, a component for implementation of trained AI processing manages operation of a contextual evaluation model 122, a video feed adaptation model 124 and a placement configuration model 126. In representation 120, downstream processing efficiency of subsequently applied trained AI modeling is improved by an ordered application of trained AI models. That is, processing results from earlier applied AI models can be propagated to subsequently applied AI models. For example, a trained AI model may evaluate a level of cropping of a video feed as presently displayed, which may then be utilized to dictate a level of adaptation or modification applied to a video feed for generation of a combined representation in a preferred application or service (e.g., collaborative communication application/service that is used to conduct a remote electronic meeting).

An exemplary contextual evaluation model 122 is adapted to contextually analyze a state of a video feed as presented at a given point in time. In representation 120, the contextual evaluation model 122 is a first applied trained AI model (e.g., first trained AI model) in an ordered plurality of trained AI models that are utilized to generate exemplary combined representations of one or more video feeds and presentation content. An exemplary contextual evaluation model 122 may be trained using training data as known to one skilled in the field of art. Above what is traditionally known, training data may comprise a plurality of image sets that can be utilized to condition a classifier of the contextual evaluation model 122 for evaluation of any type of image content. Knowledge repositories 110 (FIG. 1A) provide robust access, via distributed computing, to image training data, entity identification databases, etc., which can be utilized to enable the contextual evaluation model 122 to generate the most accurate predictive classifications for objects within a video feed.

As an example, the contextual evaluation model 122 may be a CNN that is adapted to analyze data attributes (data and metadata) of one or more video feeds to generate contextual determinations for combining a video feed with the presentation content based on analysis of the video feed. For instance, the contextual evaluation model 122 is adapted to break down a video feed into frames and analyze pixels of one or more frames to generate exemplary contextual determinations about a state of a video feed. For example, the contextual evaluation model 122 executes image segmentation (e.g., semantic segmentation and/or instance segmentation) on at least one frame of the video feed to determine one or more regions of interest in the at least one frame of the video feed. Processing for execution of image segmentation is known to one skilled in the field of art. Some non-limiting examples of image segmentation that may be utilized to adapt contextual evaluation model 122 comprise but are not limited to: region-based segmentation; edge detection segmentation; clustering methods; or a combination thereof. As an example of some processing operations, a CNN model is used to extract feature maps from images. Extracted features are then utilized as input for subsequent layers of a CNN. In one instance, a feature map is passed through a region proposal network (RPN) which returns candidate bounding boxes for identified objects within a frame of the video feed. Processing is applied via a pooling layer and a fully connected network layer to generate predictive classifications as to objects that correspond with identified bounding boxes. This type of analysis can help determine a focus of a video feed, for example, if the video feed is cropped to focus a region of interest (e.g., a head or head region of a user).

As previously identified, contextual determinations of the present disclosure are not limited to cropping determinations. As such, a contextual evaluation model 122 may be configured to evaluate other data attributes associated with a video feed. The contextual evaluation model 122 may be adapted to execute analysis on additional types of contextual determinations that can be used to aid subsequent execution of trained AI processing and ultimately aid generation of a combined representation. For example, contextual determinations, generated by the first trained AI model may comprise: a size determination indicating a size of the video feed; a video resolution determination indicating a video resolution of the video feed; an aspect ratio of a video feed; and a frame rate determination indicating a frame rate of the video feed, among other examples. Such contextual determinations may assist an application or service with managing a representation of a video feed to meet the processing standards (or requirements) for presenting content. For instance, an application/service from which a camera feed is imported may present content (e.g., video feeds) at specific quality level where resolution and/or frame rate may need to be adjusted to meet quality standards (or requirements) of an application/service that is to render a modified representation of the video feed (e.g., an exemplary combined representation).

An exemplary video feed adaptation model 124 is adapted to select a level of adaptation for a video feed based on analysis of exemplary contextual determinations generated by the contextual evaluation model 122. In representation 120, the video feed adaptation model 124 is a second applied trained AI model (e.g., second trained AI model) in an ordered plurality of trained AI models that are utilized to generate exemplary combined representations of one or more video feeds and presentation content. As an example, the video feed adaptation model 124 may be a CNN that is adapted to analyze exemplary contextual determinations relative to requirements of a host application/service that is to be presenting a video feed relative to presentation content. The video feed adaptation model 124 selects a level of adaptation of a video feed to focus on one or more regions of interest, for example, identified by developers. As an example, a region of interest is a head region of at least one user, where the video feed adaptation model 124 determines whether a video feed needs to be cropped to focus on a head of a user. Among other types of training data, the video feed adaptation model 124 may be trained based on developer set business rules for presentation of content (e.g., a video feed and/or presentation content) within specific host applications/services. For instance, different host applications/services may have different requirements for presenting a video feed (e.g., regions of interest, quality, aspect ratio, resolution), where the video feed adaptation model 124 can learn over time to determine a level of adaptation for a video feed based on the host application/service in which a combined representation is to be generated.

As previously described, levels of adaptation pertain to developer set determinations as to how much a video feed is required to be modified for inclusion in an exemplary combined representation. For instance, a video feed may be adequately cropped on a predetermined region of interest (e.g., a head of a user) and require no cropping modification. In another example, a video feed may be a full body representation of a user that requires cropping modification to focus on a head of a user for inclusion of the video feed in a combined representation. In some alternative examples, additional types of contextual determinations may also correspond to levels of adaptation of a video feed. For instance, a resolution, aspect ratio, and/or frame rate of a video feed may need to be modified to meet quality standards (or requirements) of an application/service that is presenting the combined representation. Developers may pre-set levels of adaptations pertaining to one or more contextual determinations previously described. That is, a level of adaptation of a video feed is selected based on analysis of exemplary contextual determinations including a cropping determination. Exemplary contextual determinations (e.g., generated by the contextual evaluation model 122) may be propagated to the video feed adaptation model 124 that is adapted to select a level of adaptation of a video feed. In specific instances where a level of adaptation of a video feed pertains to a level of cropping of a video feed, the video feed adaptation model 124 is adapted to manage cropping of the video feed for combination with the presentation content.

For example, a level of adaptation of a video feed is selected based on analysis of the cropping determination indicating whether (or not) the video feed is cropped on a head (region) of at least one user. In one technical instance, a level of adaptation of a video feed is a determination that no modification or adaptation is required to the video feed. In one specific example where a cropping determination is used as a basis for selecting a level of adaptation, a level representing no modification is selected, effectively bypassing any cropping of the video feed when the cropping determination indicates that the video feed is already cropped to focus on the head (region) of at least one user. This information can be useful to improve processing efficiency of trained AI processing where an AI model (e.g., video feed adaptation model 124) specifically trained to modify a video feed (e.g., crop a video feed) is able to be bypassed when it is determined that a video feed requires no additional modification (e.g., is adequately cropped) for the purpose of generating a combined representation. In another technical instance, a level of adaptation of a video feed is a determination that a modification or adaptation is required to the video feed. In one specific example where a cropping determination is used as a basis for selecting a level of adaptation, a level representing modification (or adaptation) of a video feed is selected when the cropping determination indicates that the video feed requires cropping to focus on the head (region) of at least one user. Additional designations of levels of modifications may also be introduced depending on the type of contextual determinations that the video feed adaptation model 124 is adapted to focus on. For instance, if contextual determinations indicate that a quality of a video feed needs to be modified, additional designations as to a level of modification (or adaptation) are required beyond just whether a video feed is appropriately cropped on a region of interest. In another example, a representation of a video feed may need to be displayed with a specific aspect ratio. Data pertaining to a selected level of adaptation of a video feed, including data indicating specific modifications (or adaptations) to a video feed pertaining to cropping, quality, etc., may be propagated exemplary placement configuration model 126 that is adapted to manage placement of the video feed relative to the presentation content.

An exemplary placement configuration model 126 is adapted to select a placement configuration for the video feed relative to the presentation content based on a comparative analysis of the data associated with the level of adaption of the video feed and data attributes of objects within the presentation content. In representation 120, the placement configuration model 126 is a third applied trained AI model (e.g., third trained AI model) in an ordered plurality of trained AI models that are utilized to generate exemplary combined representations of one or more video feeds and presentation content. An exemplary placement configuration model 126 may be trained using training data as known to one skilled in the field of art. Above what is traditionally known, training data may comprise different types of presentation content, for example, having different object types and layouts. In an example where slide-based content is being analyzed, the placement configuration model 126 may utilize a corpus of training data that comprises templates of slide-based presentations and/or previously generated slide-based presentation deck that are generated for training purposes. It is to be recognized that a corpus of training data comprises content that is data compliant and does not pose any privacy or regulatory concerns with respect to user data or data retention. Knowledge repositories 110 (FIG. 1A) provide robust access, via distributed computing, to resources for which the placement configuration model 126 can utilize to correlate presentation content with representations of video feeds.

As an example, the placement configuration model 126 may be a CNN that is adapted to manage placement of a video feed relative to objects associated with presentation content. As previously indicated, exemplary placement configurations identify an optimal size for display of a video feed and/or presentation content as well an optimal placement position of a video feed and/or presentation content. Placement configurations of the present disclosure are generated based on a comparative analysis of data associated with a state of a video feed (e.g., based on an identified level of adaptation for a video feed) relative to data attributes of objects within presentation content. For example, data (and metadata) associated with presentation content (e.g., a slide) is analyzed to determine data attributes pertaining to presentation content including data attributes of specific objects individually as well as relative to one another. Analysis of data associated with presentation content comprises analyzing data attributes indicating one or more of: a layout of objects within specific presentation content (e.g., a slide); object types within specific presentation content; object size(s) of corresponding objects associated within the specific presentation content; and spacing between objects within specific presentation content, among other examples.

As such, an exemplary placement configuration model 126 analyzes data and/or metadata of objects associated with presentation content to identify relationships (quantitative and/or qualitive) between objects as well as determinations as to applicable whitespace within specific presentation content, for example, between and/or around objects of the specific presentation content. This can help identify optimal size options and placement position options for presenting a representation of a video feed as part of a combined representation. Furthermore, selection of a placement position comprises analyzing data associated with video feed comprising data associated with a level of adaptation of a video feed for generation of a combined representation. The placement configuration model 126 may further correlate size attributes of a video feed with exemplary data attributes analyzed pertaining to objects of presentation content. In further instances, application-specific or service-specific requirements for representation of a video feed (e.g., aspect ratio) may be further taken into account when selecting a size of a video feed for a combined representation.

In one example, confidence scoring metrics are then generated to identify candidate placement positions for a representation of a video feed relative to presentation content based on available whitespace corresponding with a layout of objects within specific presentation content and a determined size of a representation of a video feed (e.g., a state of a video feed after cropping determinations and any subsequent modification). Developers may apply rules (e.g., business rules) for selecting an optimal placement position for a representation of a video feed based on a result of analyzing exemplary confidence scoring. For instance, a highest scoring candidate placement position is selected for a representation of a video feed in a combined representation.

The placement configuration model 126 may further generate a combined representation comprising a combined representation of a video feed and presentation content, for example, based on data associated with a selected placement configuration. In alternative examples, data associated with a selected placement configuration is transmitted from the placement configuration model 126 to a specific host application/service (or application/service component 104 of FIG. 1A) for causing rendering of a combined representation.

FIG. 2 illustrates exemplary method 200 related to automated generation and management of a combined representation comprising one or more video feeds and presentation content, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100 (FIG. 1A) and representation 120 (FIG. 1B). Processing operations performed in method 200 may correspond to operations executed by a system and/or service that execute computer modules/programs, software agents, application programming interfaces (APIs), plugins, AI processing including application of trained data models, intelligent bots, neural networks, transformers and/or other types of machine-learning processing (e.g., trained machine learning modeling including hybrid machine learning models), among other examples. In one non-limiting example, processing operations described in method 200 may be executed by a computer component such as: a user computing device 102; an application/service component 104; a video feed management component 106; a component for implementation of trained AI processing 108, or a combination thereof. In distributed examples, processing operations described in method 200 may be implemented by one or more computer components connected over a distributed network. For example, computer components may be executed on one or more network-enabled computing devices, connected over a distributed network, that enable access to user communications.

Method 200 begins at processing operation 202, where trained AI processing is managed that is adapted to contextually analyze one or more video feeds relative to presentation content. Generation and management of a trained AI processing, such as one or more trained machine learning models, including training of one or more classifiers is known to one skilled in the field of art. Above what is traditionally known, AI processing is tailored to execute specific processing described in the presentation disclosure pertaining to automatic adaptation of one or more video feeds relative to presentation content (or visa-versa). In one example, trained AI processing comprises a hybrid AI model (e.g., hybrid machine learning model) that is adapted and trained to execute a plurality of processing operations described in the present disclosure. In alternative examples, trained AI processing comprises a collective application of a plurality of trained AI models (e.g., 3 trained AI models) that are separately trained and managed, though interface, to execute processing described herein. In examples where a plurality of independently trained and managed AI models is implemented, downstream processing efficiency is improved by an ordered application of trained AI models where processing results from earlier applied AI models can be propagated to subsequently applied AI models. For example, a trained AI model may evaluate a level of cropping of a video feed as presently displayed, which may then be utilized to dictate a level of adaptation or modification applied to a video feed for generation of a combined representation in a preferred application or service (e.g., collaborative communication application/service that is used to conduct a remote electronic meeting). Non-limiting examples of trained AI processing that is applicable has already been described in the foregoing description including the description of system diagram 100 (FIG. 1A) and representation 120 (FIG. 1B).

Management (processing operation 202) of trained AI processing may further comprise generating an AI model that is tuned to reflect specific metrics for accuracy, precision and/or recall before a trained AI model is exposed for real-time (near real-time) usage. Developers may set thresholds for specific metrics to make sure that trained AI modeling is operating as expected. Thresholds for metric evaluation of a specific trained AI model may vary, depending on developer specifications, without departing from the spirit of the present disclosure. In further examples, user feedback may be received and used to continuously update a trained AI model to improve predictions and generate combined representations that are contextually relevant. As such, any user activity, including user feedback received with respect to GUI notifications and/or rendering of combined representations, social/emotional surveys, etc., may be used to update (processing operation 226) any AI modeling. For instance, user feedback may be utilized to continuously improved results of trained AI processing including build from previous iterations of trained AI modeling.

Once a threshold (or thresholds) is met for exposing trained AI processing, flow of method 200 proceeds to processing operation 204. At processing operation 204, the trained AI processing is exposed for real-time (or near real-time) evaluation of one or more video feeds relative to presentation content. Processing for exposing trained AI processing for application is known to one skilled in the field of art.

Flow of method 200 then proceeds to processing operation 206. At processing operation 206, a video feed and presentation content are detected. One or more video feeds may be detected (processing operation 206) from computing devices (e.g., user computing devices) through interfacing between host applications/services. In one example, a video feed is presented concurrently with presentation content in a GUI of a presentation application/service or other host application/service or a collaborative communication application/service. For instance, users may be utilizing the collaborative communication application/service to conduct a remote electronic meeting that comprises presentation of one or more video feeds and presentation content that was created through a presentation application/service. In some alternative examples, a video feed and presentation content are detected in an asynchronous manner, where each is detected at a different point in time. For instance, user video feeds may be presented at the start of a remote electronic meeting where a slide-based presentation deck is then added to a remote electronic meeting at a later point in time. In some examples, detection of one or more video feeds and presentation content may occur through different host application/services, for example, that are concurrently executing on one or more computing devices of users who are participants in a remote electronic meeting. For instance, one or more APIs may be utilized to detect a launch of presentation content through a presentation application/service, and/or one or more video feeds through a remote electronic meeting conducted through a collaborative communication application/service, which may be an indication that a user is attempting to add presentation content to the remote electronic meeting (e.g., through screen sharing). In further technical instances, analysis of signal data may help identify a likelihood that a user will concurrently present presentation content and at least one video feed. This type of contextual analysis can be useful to determine when to apply specific trained AI processing (e.g., analyze a video feed to make a cropping determination and/or analyze data attributes of presentation content) to reduce latency when applying trained AI processing. As indicated in the foregoing, analysis of signal data, including user-specific signal data, occurs in compliance with user privacy regulations and policies. For instance, users may consent (or opt-in) to monitoring of signal data to improve user experience and operation of applications/services associated with a software data platform.

Flow of method 200 then proceeds to processing operation 208. At processing operation 208, trained AI processing (e.g., one or more trained AI models) is then applied, for example, to generate a combined representation of one or more video feeds and presentation content. As indicated in the foregoing, the present disclosure relates to application of AI processing that is adapted to manage automatic adaptation of one or more video feeds relative to presentation content. In doing so, trained AI processing comprises execution of a plurality of processing operations (e.g., labeled 210-218 of method 200). For example, trained AI processing automatically generates a combined representation comprising one or more video feeds and presentation content, where a video feed and/or presentation content is contextually modified relative to one another. A combined representation may comprise a modification of the one or more video feeds, objects of presentation content or a combination thereof, whereas a scope of a modification is determined based on a result of contextual analysis of a video feed relative to objects of presentation content. For instance, trained AI processing executes analysis of a video feed to generate contextual determinations usable to understand how a video feed is displayed and what level of adaptation is necessary to optimize display of the video feed relative to presentation content. As a non-limiting example, a video feed may display multiple objects and need to be cropped to focus on a head region of a user who is speaking. In other instances, a video feed may already be framed properly, whereby trained AI processing can be managed efficiently by avoiding unnecessary processing.

During the course of applying exemplary trained AI processing, flow of method 200 proceeds to processing operation 210. At processing operation 210, trained AI processing executes processing operation that comprise generating contextual determinations that are usable for combining the video feed with the presentation content based on analysis of the video feed. Exemplary contextual determinations comprise a cropping determination indicating whether the video feed is cropped to focus on a head (region) of at least one user. In alternative examples, other regions of interest (e.g., identified objects) may be set by developers without departing from the spirit of the present disclosure. Trained AI processing (e.g., a first trained AI model) executes image segmentation of at least one frame of the video feed to determine one or more regions of interest in the at least one frame of the video feed. In an example where a head of a user is a region of interest, an exemplary cropping determination determines whether the video feed is cropped to display the head of the at least one user based on analysis of the one or more regions of interest in the at least one frame. Developers may specify one or more regions of interest pertaining to a cropping determination. Contextual determinations of the present disclosure are not limited to cropping determinations. In some examples, trained AI processing is configured to execute analysis on additional types of contextual determinations that can be used to aid subsequent execution of trained AI processing and ultimately aid generation of a combined representation. For example, contextual determinations, generated by the first trained AI model may comprise: a size determination indicating a size of the video feed; a video resolution determination indicating a video resolution of the video feed; an aspect ratio of a video feed; and a frame rate determination indicating a frame rate of the video feed, among other examples. Such contextual determinations may assist an application or service with managing a representation of a video feed to meet the processing standards (or requirements) for presenting content. For instance, an application/service from which a camera feed is imported may present content (e.g., video feeds) at specific quality level where resolution and/or frame rate may need to be adjusted to meet quality standards (or requirements) of an application/service that is to render a modified representation of the video feed (e.g., an exemplary combined representation). Exemplary contextual determinations (e.g., generated by an exemplary first trained AI model) may be propagated to a second trained AI model or second part of a hybrid AI model that is adapted to select a level of adaptation of a video feed. In specific instances where a level of adaptation of a video feed pertains to a level of cropping of a video feed, a second trained AI model is adapted to manage cropping of the video feed for combination with the presentation content. However, it is to be recognized that trained AI modeling may be adapted to consider any of the types of contextual determinations previously described individually or in combination.

Moreover, trained AI processing executes processing operation that comprise selecting (processing operation 212) a level of adaptation of a video feed to focus on one or more regions of interest. Levels of adaptation pertain to developer set determinations as to how much a video feed is required to be modified for inclusion in an exemplary combined representation. For instance, a video feed may be adequately cropped on a predetermined region of interest (e.g., a head of a user) and require no cropping modification. In another example, a video feed may be a full body representation of a user that requires cropping modification to focus on a head of a user for inclusion of the video feed in a combined representation. In some alternative examples, additional types of contextual determinations may also correspond to levels of adaptation of a video feed. For instance, a resolution and/or frame rate of a video feed may need to be modified to meet quality standards (or requirements) of an application/service that is presenting the combined representation. Developers may pre-set levels of adaptations pertaining to one or more contextual determinations previously described. That is, a level of adaptation of a video feed is selected based on analysis of exemplary contextual determinations including a cropping determination.

As previously indicated, one example of a region of interest is a head (region) of a user (or users). As an example, a head region of a user may comprise a preset number of pixels surrounding (or relative to an identified head (or face) of a user. For instance, a preset number of pixels surrounding a head of a user may be identified to include a head of a user, neck, upper body, surrounding background, etc. A level of adaptation of a video feed may be set pertaining to a cropping determination (e.g., executed by a first trained AI model or first part of a hybrid AI model). For example, a level of adaptation of a video feed is selected (processing operation 212) based on analysis of the cropping determination indicating whether (or not) the video feed is cropped on a head (region) of at least one user. In one technical instance, a level of adaptation of a video feed is a determination that no modification or adaptation is required to the video feed. In one specific example where a cropping determination is used as a basis for selecting a level of adaptation, a level representing no modification is selected (processing operation 212), effectively bypassing any cropping of the video feed when the cropping determination indicates that the video feed is already cropped to focus on the head (region) of at least one user. This information can be useful to improve processing efficiency of trained AI processing where an AI model (e.g., second trained AI model) specifically trained to modify a video feed (e.g., crop a video feed) is able to be bypassed when it is determined that a video feed requires no additional modification (e.g., is adequately cropped) for the purpose of generating a combined representation. In another technical instance, a level of adaptation of a video feed is a determination that a modification or adaptation is required to the video feed. In one specific example where a cropping determination is used as a basis for selecting a level of adaptation, a level representing modification (or adaptation) of a video feed is selected (processing operation 212) when the cropping determination indicates that the video feed requires cropping to focus on the head of at least one user. Additional designations of levels of modifications may also be introduced depending on the type of contextual determinations that trained AI processing is adapted to focus on. For instance, if contextual determinations indicate that a quality of a video feed needs to be modified, additional designations as to a level of modification (or adaptation) are required beyond just whether a video feed is appropriately cropped on a region of interest. Data pertaining to a selected level of adaptation of a video feed, including data indicating specific modifications (or adaptations) to a video feed pertaining to cropping, quality, etc., may be propagated to a third trained AI model or third part of a hybrid AI model that is adapted to manage placement of the video feed relative to the presentation content.

Flow of method 200 then proceeds to processing operation 214. At processing operation 214, trained AI processing is further adapted to select a placement configuration for the video feed relative to the presentation content based on a comparative analysis of the data associated with the level of adaption of the video feed and data attributes of objects within the presentation content. In examples where a plurality of trained AI models is interfacing to collectively generate a combined representation, a third trained AI model may be adapted to manage placement of a video feed relative to objects associated with presentation content. As previously indicated, exemplary placement configurations identify an optimal size for display of a video feed and/or presentation content as well an optimal placement position of a video feed and/or presentation content. As a non-limiting example, rendering of a combined representation may comprise presentation content in the form of slide-based presentation content. An exemplary placement configuration for a video feed is selected for a slide of the slide-based presentation content.

Placement configurations of the present disclosure are generated based on a comparative analysis of data associated with a state of a video feed (e.g., based on an identified level of adaptation for a video feed) relative to data attributes of objects within presentation content. For example, data (and metadata) associated with presentation content (e.g., a slide) is analyzed to determine data attributes pertaining to presentation content including data attributes of specific objects individually as well as relative to one another. Analysis of data associated with presentation content comprises analyzing data attributes indicating one or more of: a layout of objects within specific presentation content (e.g., a slide); object types within specific presentation content; object size(s) of corresponding objects associated within the specific presentation content; and spacing between objects within specific presentation content, among other examples. Applying trained AI modeling to analyze data and/or metadata of objects associated with presentation content identifies relationships (quantitative and/or qualitative) between objects as well as determinations as to applicable whitespace within specific presentation content, for example, between and/or around objects of the specific presentation content. This can help identify optimal size options and placement position options for presenting a representation of a video feed as part of a combined representation.

Furthermore, selection (processing operation 214) of a placement position comprises analyzing data associated with video feed comprising data associated with a level of adaptation of a video feed for generation of a combined representation. Using trained AI processing (e.g., a trained machine learning model) size attributes of a video feed may be correlated with exemplary data attributes analyzed pertaining to objects of presentation content. In one example, confidence scoring metrics are then generated to identify candidate placement positions for a representation of a video feed relative to presentation content based on available whitespace corresponding with a layout of objects within specific presentation content and a determined size of a representation of a video feed (e.g., a state of a video feed after cropping determinations and any subsequent modification). Developers may apply rules (e.g., business rules) for selecting an optimal placement position for a representation of a video feed based on a result of analyzing exemplary confidence scoring. For instance, a highest scoring candidate placement position is selected for a representation of a video feed in a combined representation.

In other examples, an optimal size of a representation of a video feed is not determined until a contextual evaluation is executed between data associated with a representation of a video feed and data attributes of presentation content. For instance, a comparative evaluation of data associated with a video feed and data attributes of objects of presentation content (e.g., of a slide) yield determinations as to a size of a representation of a video feed as well as a layout position of the representation of the video feed. Confidence scoring can be generated for determining candidate placement positions, where a size and layout position of a representation of a video feed is determined (and may vary) as part of individual candidate placement positions. Similar to previous examples, developers may apply rules (e.g., business rules) for selecting (processing operation 214) an optimal placement position, where applied rules may consider both a layout position of the representation of the video feed as well as a size. For instance, a larger size of a video feed may be preferred in some technical instances. In other instances, the type of data object (or importance of the data objects within specific presentation content) may factor into where/how a representation of a video feed is to be presented. In some additional examples, trained AI processing (e.g., a third trained AI model) is further adapted to generate confidence scoring pertaining to a prioritization of objects.

As previously indicated, a prioritization analysis may be executed to rank a priority of content portions (e.g., objects) within specific presentation content. Prioritization analysis of presentation content may help yield determination as to what is the most important content within specific presentation content as well as what objects are the least important. This type of contextual analysis can not only help select an optimal placement position of a representation of a video feed when keeping objects of presentation content at fixed positions, but also can be used to determine how a layout of objects of presentation content can be rearranged to optimize a combined representation. In one example, it may be optimal to place a representation of a video feed next to the most important objects of presentation content, as determined from a prioritization analysis, even in instances where a size of a representation of a video feed may be smaller than that of another candidate placement position. In any instance, application of trained AI processing creates data-driven results that may present a plurality of possibilities as candidate placement positions. Analysis of results from application of trained AI processing may help developers set rules for selection of an optimal placement configuration as well as parameters to focus on for selection of an optimal placement position.

Trained AI processing (e.g., a third trained AI model) is then configured to automatically generate (processing operation 216) a combined representation of the video feed and the presentation content based on analysis of a selected placement configuration. In some alternative examples, a selected placement configuration is utilized to modify only a representation of a video feed relative to presentation content. As an example, generation (processing operation 216) of the combined representation comprises creation of a layered representation of a video feed relative to the presentation content, where a representation of a video feed overlays presentation content according to the placement configuration. Further, as referenced in the foregoing description, a representation of a video feed (e.g., within a combined representation) focuses on a specific region of interest. In an example where a region of interest is a head (region) of a user, the combined representation is rendered to have the video feed focus on the head of at least one user. In technical instances where multiple users are displayed in a video feed, a video feed in a combined representation may be cropped to focus on the heads of the multiple users.

In some examples of method 200, processing proceeds to processing operation 218. At processing operation 218, one or more data insights are generated providing data insight about an exemplary combined representation. Trained AI processing of the present disclosure may propagate results of any aspect of contextual analysis to a data insight service to enable generation of contextually relevant data insights. Processing for generation of data insights is known to one skilled in the field of art. Above what is traditionally known, data insights are generated pertaining to specific contextual analysis described in the present disclosure including the generation and update of exemplary combined representations. For instance, a data insight may be generated (processing operation 218), based on a result of the contextual analysis executed by trained AI processing. Among other examples, data insights may be generated pertaining but not limited to: contextual determinations including cropping determinations; selection of a level of adaptation of a video feed; selection of a placement configuration; analysis of presentation content including data objects and layouts; generation of a combined representation; positional location of a video feed (e.g., relative to presentation content); generation of visual effects pertaining to a combined representation; analysis pertaining to regions of interest within a video feed; user-specific analysis (e.g., pertaining to video feeds and/or presentation content); and results of analysis of various types of signal data previously identified, among other examples. Moreover, signal data from one or most host applications/services may further be analyzed, with user consent, to continuously update a combined representation. For instance, changes to a state of a remote electronic meeting may be detected and used to foster data insight generation pertaining to updates to combined representations.

In any example, flow of method 200 may proceed to processing operation 220. At processing operation 220, a representation of a video feed and/or an exemplary combined representation is then caused to be rendered within a GUI of a host application/service. For instance, an exemplary GUI of a host application/service is that which is presenting the presentation content and one or more video feeds. With respect to presentation of a video feed relative to presentation content, the combined representation creates a layered representation that overlays a video feed over the presentation content according to the placement configuration. In one example, presentation content is a slide (e.g., of a slide-based presentation), a representation of a video feed is a cropped to focus on a head (region) of at least one user and the combines representation optimizes position and size of the representation of the video feed to overlay the slide while not obscuring any content (e.g., data objects) of the slide. In alternative examples, contextual analysis of a video feed relative to presentation content may cause rendering of a combined representation that modifies presentation content to accommodate for placement of a representation of a video feed. For instance, position, size and/or formatting of presentation content may be modified to optimize an exemplary combined representation.

In some examples, a combined representation may be generated and caused to be rendered as different representations across multiple different host applications/services. For instance, an open-source collaborative framework may enable management of different content representations across different host applications/services, where multiple versions of a combined representation can be presented across different host applications/services.

Further non-limiting examples of the present disclosure extend to GUI management of combined representations through an adapted GUI of an application or service. As an example, once a representation of a video feed is automatically adapted relative to presentation content, a GUI of an application/service may further be adapted to present GUI features for control of an exemplary combined representation including one or more video feeds, presentation content, or a combination thereof. For instance, a GUI of a host application/service is modified to provide a GUI menu providing GUI features for control of an exemplary combined representation. Among other features, a GUI menu configured to provide control over a combined representation. Non-limiting examples of such GUI features enable control over one or more of the following: a size of a representation of a video feed relative to presentation content (e.g., maximize a size of a video feed in the combined representation); emphasis on presentation content in the combined representation (e.g., temporarily during a point in a presentation); automatic display of effects to a video feed to emphasize presentation content; fixing display of video feeds relative to changes in presentation content; and disjoining of a combined representation, among other examples. Visual effects (e.g., animations, callouts) may be added to a representation of video feed based on a result of contextual analysis of presentation content. In one, visual effects may be automatically applied to a representation of a video feed to help emphasize presentation content being presented and/or presentation of the same may be initiated by users through selection of GUI features (e.g., of a GUI menu configured to manage a combined representation).

In further examples of the present disclosure, trained AI processing is adapted to continuously update representation of one or more video feeds based on changes to presentation content. Consider a technical instance where presentation content is a slide-based presentation. As slide content changes, a representation of a video feed (e.g., in a combined representation) may also need to be modified. For example, more (or less) whitespace may be available in a displayed slide, where a size and/or layout position of a video feed or objects of presentation content may be modified to optimize display. In further instances, content of a video feed may be changed where a size of a video feed may need to be modified. As an example, an additional speaker may be added to a displayed video feed or additional video feeds may be added as presenters for presentation content. In any case, trained AI processing is continuously applied to automatically update an exemplary combined representation or alternatively a representation of a video feed.

Continuing method 200, flow proceeds to decision operation 222. At decision operation 222, it is determined whether an update occurs to presentation content. In an example where presentation content is a slide-based presentation (e.g., a slide-based presentation deck), presentation content may change a presentation shifts to new slides. For instance, a change is detected to display of a slide-based presentation content, where the presentation content changes from display of the slide to display of a second slide of the slide-based presentation content. In an example where an update to presentation content is detected, flow of decision operation 222 branches "YES" and processing of method 200 returns to processing operation 208. In response to detecting the change to display of the slide-based presentation content, an updated placement configuration for the video feed relative to the presentation content of the second slide is selected. For example, a third trained AI model executes processing to select a placement configuration for a representation of a video feed and/or objects of presentation content of a newly displayed slide. As such, an updated placement configuration is selected based on a comparative analysis of the data associated with the level of adaption of the video feed and data attributes of objects within the second slide. A representation of a video feed or a combined representation of the video feed and the presentation content is then automatically updated so that the video feed the second slide according to the updated placement configuration. This process may repeat for additional presentation content (e.g., additional slides of a slide-based presentation deck). Processing efficiency for generating updated placement configurations is greatly improved by already having optimized a video feed for rendering in a combined representation. For instance, trained AI processing understands that it has an optimized video feed that does not need to be cropped again, thereby focusing contextual evaluation on a comparative evaluation of a representation of a video feed relative to new presentation content. In examples where no update to presentation content is detected (e.g., presentation content remains the same or a presentation ends), flow of decision operation 222 branches "NO" and processing of method 200 remains idle until presentation content is updated (or new presentation content is introduced). Signal data received from a host application/service can further be utilized to determine whether to end processing of method 200. For instance, when a remote electronic meeting ends, application of trained AI processing may no longer be required to evaluate context of a remote electronic meeting.

FIGS. 3A-3E illustrate exemplary processing device views associated with user interface examples for an improved user interface that is adapted for management of one or more video feeds relative to presentation content, with which aspects of the present disclosure may be practiced. FIGS. 3A-3E provide non-limiting examples of a GUI that provides results of processing described in the foregoing including system diagram 100 (FIG. 1A), representation 120 (FIG. 1B), method 200 (FIG. 2), and the accompanying description of computing system 401 (FIG. 4).

FIG. 3A presents processing device view 300, illustrating a GUI of a collaborative communication application/service (e.g., MICROSOFT® TEAMS®) that is configured to provide a collaborative environment for users to communicate and share content. Processing device view 300 illustrates the presentation of a plurality GUI menus and features as well as content 302 associated with a remote electronic meeting that is being displayed in real-time (or near real-time) via a computing device (e.g., client computing device). In the example shown in processing device view 300, two users are conducting a remote electronic meeting that is managed through a GUI of the collaborative communication application/service. Some GUI controls for managing presentation of content (e.g., slide-based content 306) via the GUI of the collaborative communication application/service are displayed but not labeled in FIG. 3A as said GUI features pertain to functionality of a collaborative communication application/service that is not described in the present disclosure but is illustrated to provide a more complete representation of some of the functionality possible for presentation control of presented content through a collaborative communication application/service.

In the example shown in FIG. 3A, content 302 of the presentation comprises presentation content 306 (e.g., slide-based content). Additionally, processing device view 300 illustrates a video feed identification menu 304 that is configured to identify video feeds accessing the remote electronic meeting as well as a presentation state of said video feeds. In the example shown in FIG. 3A, two video feeds ("User 1 Feed" and "User 2 Feed") are participants in the remote electronic meeting being conducted via the collaborative communication application/service. Video feed identification menu 304 further identifies that a first user feed ("User 1 Feed") is identified (e.g., hand icon displayed next to identification of video feed) as a presenter of the presentation content 306 at the current point in time of the remote electronic meeting.

For illustrative purposes, processing device view 300 illustrates a non-limiting example where the first user video feed 308 ("User 1 Feed") is initially presented in an uncropped state via an application/service that is external to the collaborative communication application/service. For example, the first user video feed 308 ("User 1 Feed") is rendered via a camera application/service that is executing on a computing device. As can be seen in FIG. 3A, the first user video feed 308 ("User 1 Feed") is rendered in an uncropped state, where a full body representation of a user is presented. As such, the first user video feed 308 is illustrated in a state that is outside of the GUI of the collaborative communication application/service. It is to be recognized that in some examples, a state of a video feed may be rendered in another GUI window of the collaborative communication application/service. For instance, a state of a video feed as rendered through a camera application/service of a user (e.g., full body representation of video feed) may be displayed, where a video feed may still be adapted to presentation relative to presentation content 306. In some alternative examples, a video feed may also be automatically cropped to focus on a region of interest (e.g., a head region of a user) when imported into a GUI of the collaborative communication application/service but may still require further adaptation (or modification) to be presented relative to presentation content 306. In such technical instances, processing of the present disclosure is still applicable, for example, to manage generation of a combined representation.

FIG. 3B presents processing device view 320, illustrating a continued example of processing from that shown in processing device view 300 (FIG. 3A). In the example shown in FIG. 3B, a user video feed ("User 1 Feed") is automatically adapted relative to the presentation content 306, where a combined representation 322 is generated and automatically presented in the GUI of the collaborative communication application/service. The combined representation 322 comprises the presentation content 306 and a representation of first user video feed 324 ("User 1 Feed") in a multi-layered rendering where a representation of the first user video feed 324 is layered in a manner that overlays the presentation 306 according to a determined placement configuration. As previously referenced, the placement configuration determines an optimal size and layout position of the representation of first user video feed 324 relative to the presentation content 306. As can be seen in processing device view 320, the representation of first user video feed 324 is automatically adapted and placed to occupy white space of the presentation content 306 without obstructing viewing of any of the content (e.g., objects associated with the presentation content 306. Further, as referenced in the foregoing description, a representation of the first video feed 324 (e.g., within a combined representation) focuses on a specific region of interest. In an example where a region of interest is a head of a user, the combined representation is rendered to have the video feed focus on the head of at least one user as shown in combined representation 322. In technical instances where multiple users are displayed in a video feed, a video feed in a combined representation may be cropped to focus on the heads of the multiple users.

Figure 3C:
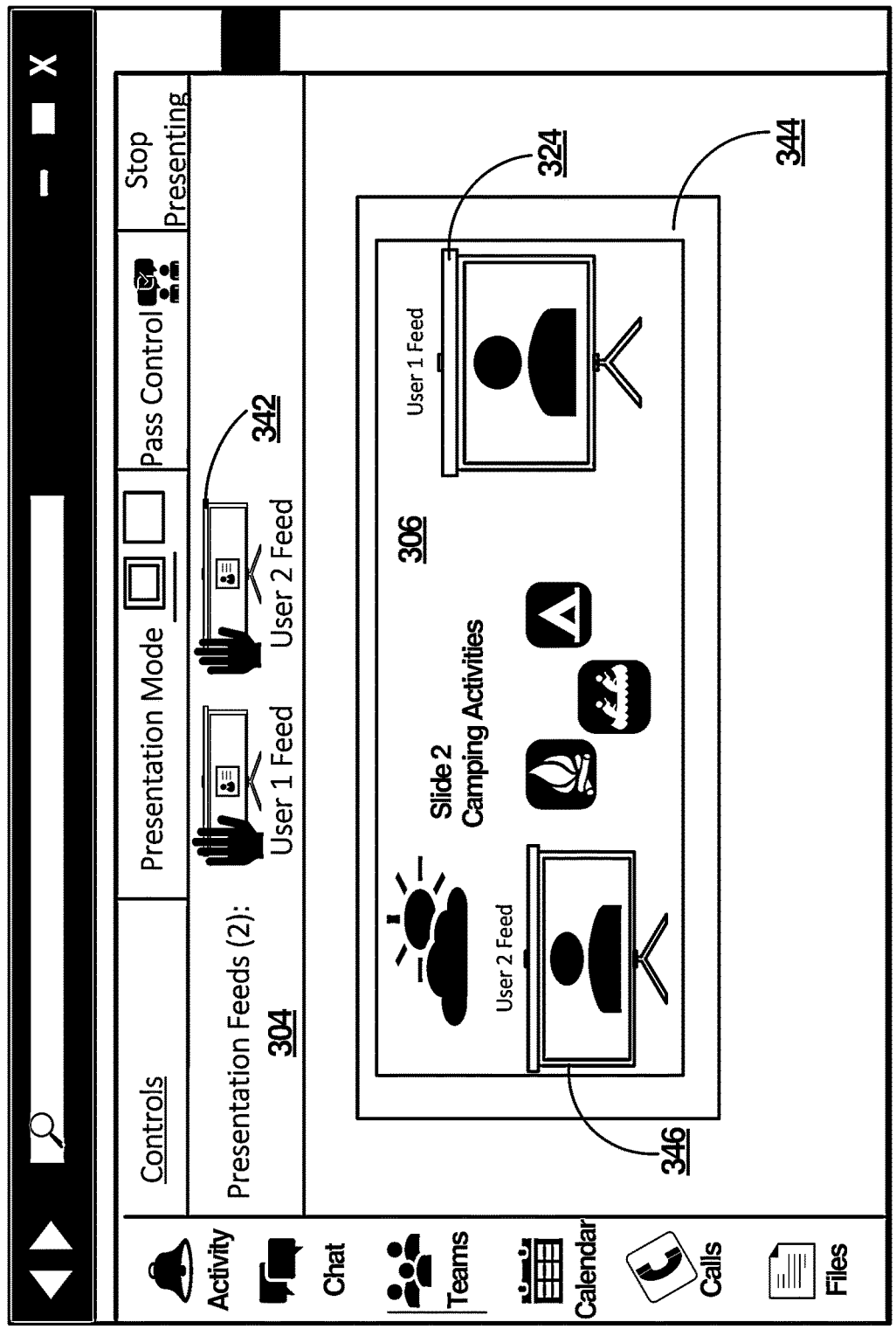
Figure 4:
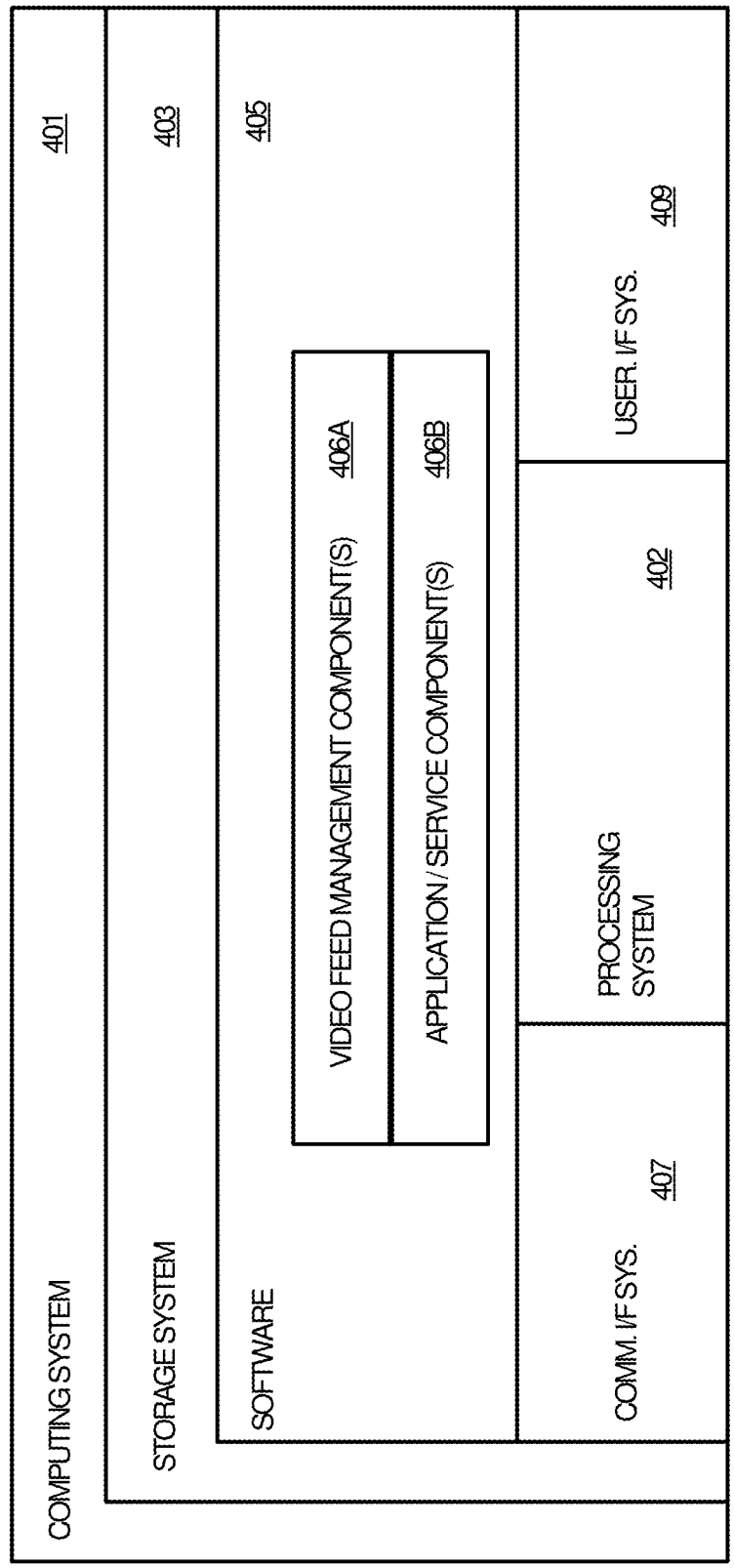
FIG. 4 illustrates a computing system suitable for implementing processing operations described herein related to management of one or more video feeds relative to presentation content, with which aspects of the present disclosure may be practiced.

FIG. 3C presents processing device view 340, illustrating a continued example of processing from that shown in processing device view 320 (FIG. 3B). In the example shown in FIG. 3C, an updated combined representation 344 is displayed that adds a second user video feed 342 ("User 2 Feed") to the combined representation 344. As can be seen in processing device view 340, video feed identification menu 304 is updated (e.g., hand icon displayed next to identification of video feed) to identify that a second user video feed 342 is added a presenter of the presentation content 306 at the current point in time of the remote electronic meeting. The present disclosure applies exemplary trained AI processing to generate an updated combined representation that adds the second user video feed 342 to the previous combined representation 322 (FIG. 3B) to automatically provide an updated combined representation 344. As can be seen in processing device view 340, a representation of second user video feed 346 is automatically adapted and placed to occupy white space of the presentation content 306 without obstructing viewing of any of the content (e.g., objects associated with the presentation content 306 or the previously rendered representation of the first user video feed 324).

Figure 3D:
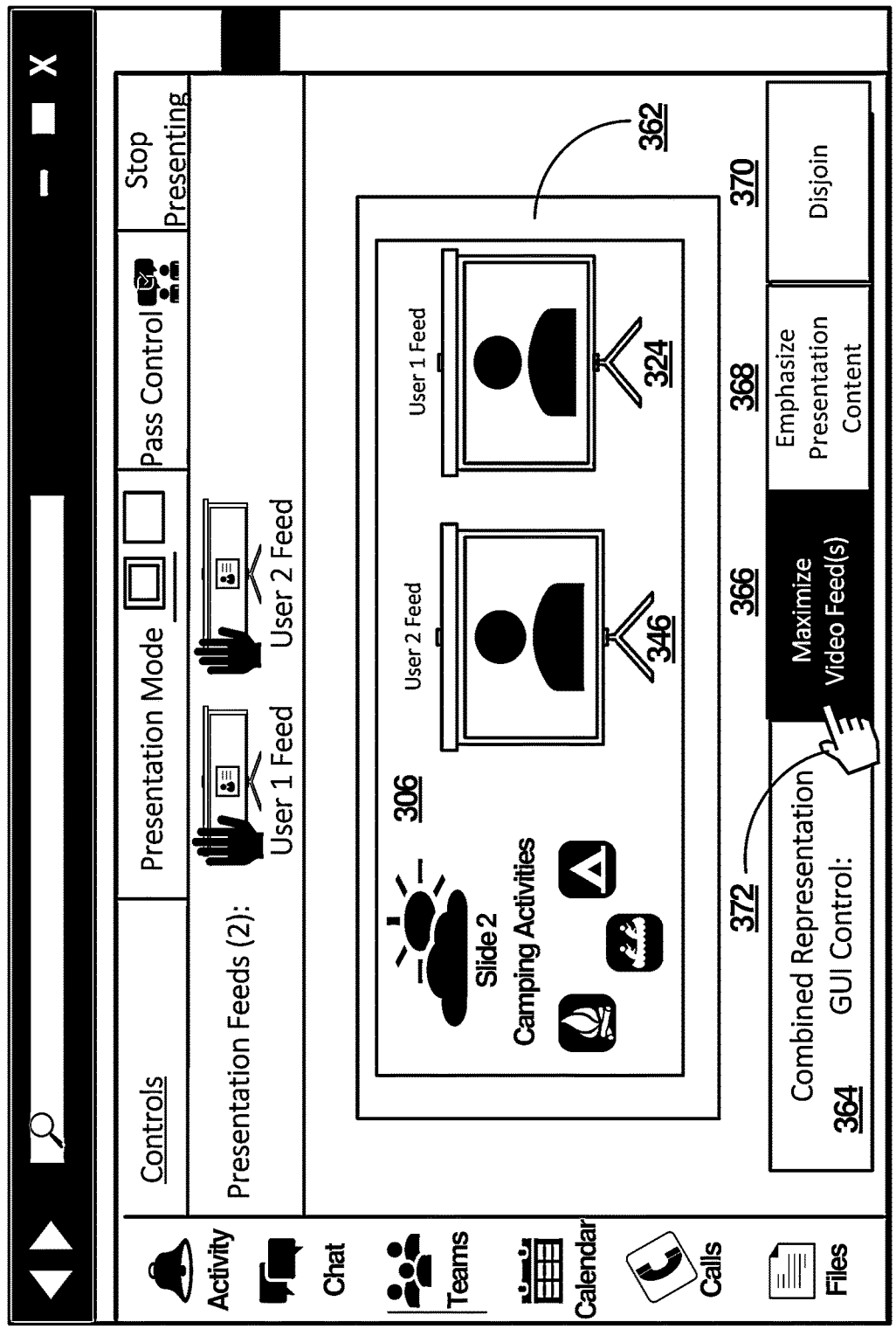

FIG. 3D presents processing device view 360, illustrating an alternative example to update of a combined representation that is shown in FIG. 3C. In the example shown in processing device view 360, an updated combined representation 362 is presented that illustrates the results of contextual analysis of presentation content relative to data associated with user video feeds. As previously referenced, application of trained AI processing creates data-driven results that may present a number of possibilities as candidate placement positions. Analysis of results from application of trained AI processing may help developers set rules for selection of an optimal placement configuration as well as parameters to focus on for selection of an optimal placement position. In the example shown in processing device view 360, a result of contextual analysis of the user video feeds relative to presentation content yielded a determination to select a placement configuration that modifies layout positioning and size of objects of the presentation content 306 to provide an optimal visual presentation of the presentation content 306 along with the multiple presenter video feeds (e.g., representation of the first user video feed 324 and representation of the second user video feed 346). In some alternative examples (not illustrated), formatting of content portions (e.g., objects) of presentation content 306 may also be modified to create an optimal placement configuration for rendering of updated combined representation 362. For instance, a content portion such as a text portion may be rendered transparent to better enable viewing of that text portion while maximizing the size and layout positioning of a video feed.

Moreover, processing device view 360 further illustrates example of an adapted GUI that provides GUI controls for managing an exemplary combined representation through a GUI of a host application/service (e.g., collaborative communication application/service). For example, a GUI of the collaborative communication application/service is adapted to provide a GUI menu 364 configured to enable control over a combined representation (or updated combined representation). Non-limiting examples of GUI features that may be provided via a GUI menu 364 configured to enable control over a combined representation comprise one or more of the following: to control: a size of a representation of a video feed relative to presentation content (e.g., maximize a size of a video feed in the combined representation); emphasis on presentation content in the combined representation (e.g., temporarily during a point in a presentation); automatic display of effects to a video feed to emphasize presentation content; fixing (or locking) display of video feeds relative to changes in presentation content; and disjoining of a combined representation, among other examples.

For example, a first GUI feature 366 is selectable to enable control over a placement configuration of a combined representation to maximize size/layout of user video feeds within an exemplary combined representation. A second GUI feature 368 is selectable to enable control over a placement configuration of a combined representation to maximize size/layout of objects within presentation content presented in an exemplary combined representation. In one example, a user can toggle between the first GUI feature 366 and the second GUI feature 368 during a presentation to change emphasis on the presentation content as well as the user video feeds. Further, a third GUI feature 370 feature is selectable to enable control over disjoining a combined representation. As previously indicated, a representation of a user video feed and/or a combined representation is automatically rendered via application of trained AI processing. In some cases, a user may prefer a different viewing representation and choose to undo a combined representation, for example, to focus on one of the presentation content 306 or the user video feeds.

Processing device view 360 further illustrates the receipt of a user action 372 that selects the first GUI feature 366 from the GUI menu 364 configured to enable control over a combined representation (or updated combined representation). As previously referenced, processing device view 360 provides an alternative updated combined representation as compared with what was illustrated in FIG. 3C. In one technical instance, receipt of user action 372 may be a trigger to generate and render the combined representation 362 shown in FIG. 3D. For example, an updated combined representation 344 (FIG. 3C) may be rendered and displayed for users via a GUI of the collaborative communication application/service. As a result of selection of the first GUI feature 366 from the GUI menu 364, a combined representation is updated to updated combined representation 362 as shown in FIG. 3D. However, it is to be recognized that results of contextual analysis by trained AI processing may have selected the updated combined representation 362 without requiring additional user actions such as a manual selection of a GUI feature (e.g., first GUI feature 366). In any examples, an adapted GUI providing GUI elements such as GUI menu 364 improves a GUI experience by enabling users to control an exemplary combined representation.

Figure 3E:
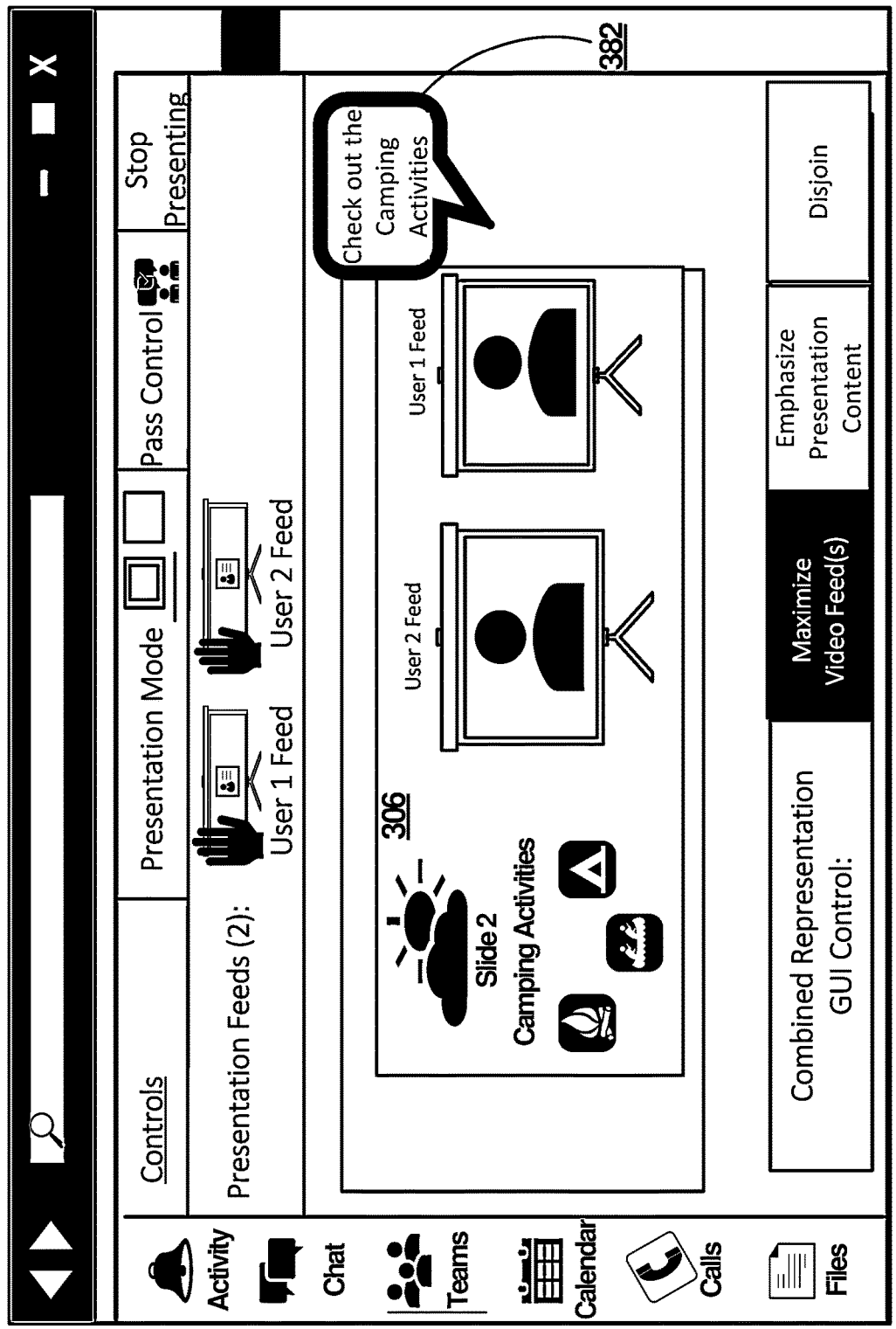

FIG. 3E presents processing device view 380, illustrating a continued example of processing from that shown in processing device view 360 (FIG. 3D). Processing device view 380 illustrates examples where contextual analysis of a presentation in real-time (or near real-time) results in the automatic update on a representation of a video feed (e.g., as part of an exemplary combined representation). As previously referenced, visual effects (e.g., animations, callouts) may be added to a representation of video feed based on a result of contextual analysis of presentation content. In one example, visual effects may be automatically applied to a representation of a video feed to help emphasize presentation content being presented and/or presentation of the same may be initiated by users through selection of GUI features (e.g., of a GUI menu configured to manage a combined representation). This may be the result of previously applied AI processing where a prioritization of presentation content is determined and then utilized to automatically update a combined representation. As an example, a result of contextual analysis of the presentation content relative to the user video feeds yields a determination to prioritize objects identified as "camping activities" as part of slide-based content (e.g., presentation content 306). As a result of this analysis, a GUI of the collaborative communication application/service is automatically updated to provide a GUI element 382 (e.g., callout) associated with an exemplary combined representation. The GUI element 382 calls attention to the prioritized presentation content (e.g., "camping activities") identified from the prioritization analysis previously executed. This is yet another way in which combined representations can be utilized to enhance a presentation experience through a host application/service.

FIG. 4 illustrates a computing system 401 suitable for implementing processing operations described herein related to management of one or more video feeds relative to presentation content, with which aspects of the present disclosure may be practiced. As referenced above, computing system 401 may be configured to implement processing operations of any component described herein including exemplary components previously described in system diagram 100 (FIG. 1). As such, computing system 401 may be configured to execute specific processing operations to solve the technical problems described herein. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 402 loads and executes software 405 from storage system 403. Software 405 includes one or more software components (e.g., 406A-B) that are configured to enable functionality described herein. In some examples, computing system 401 may be connected to other computing devices (e.g., display device, audio devices, servers, mobile/ remote devices, gaming devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1A), representation 120 (FIG. 1B), processing operations described in method 200 (FIG. 2) and/or the accompanying description of FIGS. 3A-3E.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing a video feed management component 406*a*; and application/service components 406*b*, as described herein. In further examples, software may comprise program instructions for executing a separate component for implementation of a programmed software module and/or trained AI processing though in other instances a programmed software module and/or trained AI processing may be executed by one of the other components of system diagram 100 in combination with one or more computing systems 401.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end representations of exemplary application/services described herein including rendering of: results from application of trained AI processing including automatic adaptation of video feeds relative to presentation content including generation of exemplary combined representations; management over trained AI processing including building, training and adapting trained AI models to execute processing operations described herein including GUI views for management of training data for adapting trained AI processing described herein and management of training data, log data and telemetry data; an improved GUI configured to automatically adapt video feeds relative to presentation content including generation of exemplary combined representation and new GUI menus and/or features to enable control over combined representations; enabling user interactions with GUI elements and features including presentation of GUI menus and callouts, application command control, etc. and providing notifications through different host application/service endpoints (e.g., via GUI elements, OS notifications and/or inline with content), among other examples. User interface system 409 comprises a graphical user interface that presents graphical user interface elements representative of any point in the processing described in the foregoing description including processing operations described in system diagram 100 (FIG. 1A), representation 120 (FIG. 1B), processing operations described in method 200 (FIG. 2) and/or the accompanying description of FIGS. 3A-3E.

A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output, handwritten input, AR/VR input) in conjunction with operation of exemplary applications/services described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
   detecting a video feed that is presented concurrently with presentation content of a presentation application or service, wherein the presentation content comprises a plurality of objects, the plurality of objects organized in a first layout comprising a size and a location for each object of the plurality of objects; and
   automatically applying a trained artificial intelligence (AI) model that is adapted to generate a combined representation of the video feed with the presentation content of the presentation application or service, wherein the trained AI model executes processing operations that comprise:
      generating contextual determinations for combining the video feed with the presentation content based on analysis of the video feed, wherein the contextual determinations comprise a cropping determination indicating whether the video feed focuses on a head of at least one user,
      selecting a level of adaptation of the video feed based on analysis of the contextual determinations including the cropping determination, wherein the level of adaptation is selected to focus on the head of the at least one user,
      generating a second layout of the plurality of objects in the presentation content, wherein the generating the second layout is based on the contextual determinations, and wherein the second layout is different from the first layout,
      selecting a placement configuration for the video feed relative to the presentation content in the second layout, wherein selecting the placement configuration comprises ranking a priority of content portions within the presentation content, and wherein the selecting the placement configuration is based at least in part on a comparative analysis of data associated with the level of adaption of the video feed and data attributes of the plurality of objects within the presentation content and the ranked priority of the content portions, and
      automatically generating a combined representation of the video feed and the presentation content in the second layout, wherein the automatically generating the combined representation comprises modifying the video feed based on the selected level of adaptation, wherein the modified video feed focuses on the head of the at least one user, and wherein the combined representation comprises the modified video feed overlaying the presentation content according to the placement configuration.

2. The computer-implemented method of claim 1, further comprising: causing rendering of the combined representation within a graphical user interface of the presentation application or service.

3. A computer-implemented method comprising:
   detecting a video feed that is presented concurrently with presentation content of a presentation application or service, wherein the presentation content comprises a plurality of objects, the plurality of objects organized in a first layout comprising a size and a location for each object of the plurality of objects;
   automatically applying a first trained artificial intelligence (AI) model that is adapted to generate contextual determinations for combining the video feed with the presentation content based on analysis of the video feed, wherein the contextual determinations comprise a cropping determination indicating whether the video feed focuses on a head of at least one user;
   propagating the contextual determinations, generated by the first trained AI model, to a second trained AI model that is adapted to manage cropping of the video feed for combination with the presentation content;
   selecting, using the second trained AI model, a level of adaptation of the video feed based on analysis of the contextual determinations including the cropping determination, wherein the level of adaptation is selected to focus on the head of the at least one user;
   propagating data associated with the level of adaptation of the video feed to a third trained AI model that is adapted to manage placement of the video feed relative to the presentation content;
   selecting, using the third trained AI model, a placement configuration for the video feed relative to the presentation content, wherein selecting the placement configuration comprises:
      generating a second layout of the plurality of objects in the presentation content, wherein the generating the second layout is based on the contextual determinations, and wherein the second layout is different from the first layout, and
      ranking a priority of content portions within the presentation content in the second layout, and wherein the selecting the placement configuration is based at least in part on a comparative analysis of the data associated with the level of adaption of the video feed and data attributes of the plurality of objects within the presentation content in the second layout and the ranked priority of the content portions; and
   automatically generating a combined representation of the video feed and the presentation content in the second layout, wherein the automatically generating the combined representation comprises modifying the video feed based on the selected level of adaptation, wherein the modified video feed focuses on the head of the at least one user, and wherein the combined representation comprises the modified video feed overlaying the presentation content according to the placement configuration.

4. The computer-implemented method of claim 3, further comprising: causing rendering of the combined representation within a graphical user interface of the presentation application or service.

5. The computer-implemented method of claim 3, wherein the selecting of the placement configuration for the video feed comprises selecting, based on the comparative analysis of the data associated with the level of adaption of the video feed and the data attributes of the plurality of objects within the presentation content, both of a size for display of the video feed and a placement position for overlaying the video feed over the presentation content.

6. The computer-implemented method of claim 3, wherein the first trained AI model executes image segmentation of at least one frame of the video feed to determine one or more regions of interest in the at least one frame of the video feed, and wherein the cropping determination determines whether the video feed is cropped to display the head of the at least one user based on analysis of the one or more regions of interest in the at least one frame.

7. The computer-implemented method of claim 3, wherein the contextual determinations, generated by the first trained AI model, further comprise: a size determination indicating a size of the video feed, a video resolution determination indicating a video resolution of the video feed, and a frame rate determination indicating a frame rate of the video feed.

8. The computer-implemented method of claim 3, wherein the level of adaptation of the video feed, selected by the second trained AI model, bypasses cropping of the video feed when the cropping determination indicates that the video feed is cropped to focus on the head of the at least one user.

9. The computer-implemented method of claim 3, wherein the level of adaptation of the video feed, selected by the second trained AI model, requires cropping of the video feed when the cropping determination indicates that the video feed does not focus on the head of the at least one user, and wherein the second trained AI model executes processing to crop the video feed to focus on the head of the at least one user.

10. The computer-implemented method of claim 3, wherein the presentation content is a slide of slide-based presentation content, and wherein the placement configuration for the video feed is selected for the slide of the slide-based presentation content.

11. The computer-implemented method of claim 10, further comprising:
 detecting a change to display of the slide-based presentation content where the presentation content changes from display of the slide to display of a second slide of the slide-based presentation content;
 in response to detecting the change to display of the slide-based presentation content, selecting, using the third trained AI model, an updated placement configuration for the video feed relative to the presentation content of the second slide based on a comparative analysis of the data associated with the level of adaption of the video feed and data attributes of a second plurality of objects within the second slide; and
 automatically updating the combined representation of the video feed and the presentation content so that the video feed the second slide according to the updated placement configuration.

12. A system comprising:
 at least one processor; and
 a memory, operatively connected with the at least one processor, storing computer-executable instructions that, when executed by the at least one processor, causes the at least one processor to execute a method that comprises:
  detecting a video feed that is presented concurrently with presentation content of a presentation application or service, wherein the presentation content comprises a plurality of objects, the plurality of objects organized in a first layout comprising a size and a location for each object of the plurality of objects;
  automatically applying a first trained artificial intelligence (AI) model that is adapted to generate contextual determinations for combining the video feed with the presentation content based on analysis of the video feed, wherein the contextual determinations comprise a cropping determination indicating whether the video feed focuses on a head of at least one user;
  propagating the contextual determinations, generated by the first trained AI model, to a second trained AI model that is adapted to manage cropping of the video feed for combination with the presentation content;
  selecting, using the second trained AI model, a level of adaptation of the video feed based on analysis of the contextual determinations including the cropping determination, wherein the level of adaptation is selected to focus on the head of the at least one user;
  propagating, data associated with the level of adaptation of the video feed to a third trained AI model that is adapted to manage placement of the video feed relative to the presentation content;
  selecting, using the third trained AI model, a placement configuration for the video feed relative to the presentation content, wherein selecting the placement configuration comprises:
   generating a second layout of the plurality of objects in the presentation content, wherein the generating the second layout is based on the contextual determinations, and wherein the second layout is different from the first layout, and
   ranking a priority of content portions within the presentation content in the second layout, and wherein the selecting the placement configuration is based at least in part on a comparative analysis of the data associated with the level of adaption of the video feed and data attributes of the plurality of objects within the presentation content in the second layout and the ranked priority of the content portions; and
  automatically generating a combined representation of the video feed and the presentation content in the second layout, wherein the automatically generating the combined representation comprises modifying the video feed based on the selected level of adaptation, wherein the modified video feed focuses on the head of the at least one user, and wherein the combined representation comprises the video feed overlaying the presentation content according to the placement configuration.

13. The system of claim 12, wherein the method, executed by the at least one processor, further comprises: causing rendering of the combined representation within a graphical user interface of the presentation application or service.

14. The system of claim 12, wherein the selecting of the placement configuration for the video feed comprises selecting, based on the comparative analysis of the data associated with the level of adaption of the video feed and the data attributes of the plurality of objects within the presentation content, both of a size for display of the video feed and a placement position for overlaying the video feed over the presentation content.

15. The system of claim 12, wherein the first trained AI model executes image segmentation of at least one frame of the video feed to determine one or more regions of interest in the at least one frame of the video feed, and wherein the cropping determination determines whether the video feed is cropped to display the head of the at least one user based on analysis of the one or more regions of interest in the at least one frame.

16. The system of claim 12, wherein the contextual determinations, generated by the first trained AI model, further comprise: a size determination indicating a size of the video feed, a video resolution determination indicating a video resolution of the video feed, and a frame rate determination indicating a frame rate of the video feed.

17. The system of claim 12, wherein the level of adaptation of the video feed, selected by the second trained AI model, bypasses cropping of the video feed when the cropping determination indicates that the video feed is cropped to focus on the head of the at least one user.

18. The system of claim 12, wherein the level of adaptation of the video feed, selected by the second trained AI model, requires cropping of the video feed when the cropping determination indicates that the video feed does not focus on the head of the at least one user, and wherein the second trained AI model executes processing to crop the video feed to focus on the head of the at least one user.

19. The system of claim 12, wherein the presentation content is a slide of slide-based presentation content, and wherein the placement configuration for the video feed is selected for the slide of the slide-based presentation content.

20. The system of claim 19, wherein the method, executed by the at least one processor, further comprises:

detecting a change to display of the slide-based presentation content where the presentation content changes from display of the slide to display of a second slide of the slide-based presentation content;

in response to detecting the change to display of the slide-based presentation content, selecting, using the third trained AI model, an updated placement configuration for the video feed relative to the presentation content of the second slide based on a comparative analysis of the data associated with the level of adaption of the video feed and data attributes of a second plurality of objects within the second slide; and automatically updating the combined representation of the video feed and the presentation content so that the video feed the second slide according to the updated placement configuration.

* * * * *